United States Patent
Yang et al.

(10) Patent No.: US 12,210,141 B2
(45) Date of Patent: Jan. 28, 2025

(54) OPTICAL SYSTEM, IMAGE ACQUISITION MODULE AND ELECTRONIC DEVICE

(71) Applicant: JIANGXI JINGCHAO OPTICAL CO., LTD., Nanchang (CN)

(72) Inventors: Jian Yang, Nanchang (CN); Lu Hua, Nanchang (CN); Ming Li, Nanchang (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 505 days.

(21) Appl. No.: 17/686,330

(22) Filed: Mar. 3, 2022

(65) Prior Publication Data

US 2023/0123067 A1    Apr. 20, 2023

(30) Foreign Application Priority Data

Oct. 19, 2021  (CN) .......................... 202111213926.5

(51) Int. Cl.
*G02B 13/00* (2006.01)
*G02B 9/64* (2006.01)
(Continued)

(52) U.S. Cl.
CPC ........... *G02B 13/0045* (2013.01); *G02B 9/64* (2013.01); *G02B 13/18* (2013.01); *H04N 23/55* (2023.01)

(58) Field of Classification Search
CPC ...... G02B 13/0045; G02B 9/64; G02B 13/18; G02B 13/0015; G02B 13/006; G02B 13/00; H04N 23/55; G03B 30/00
(Continued)

(56) References Cited

U.S. PATENT DOCUMENTS

2014/0139719 A1* 5/2014 Fukaya .............. G02B 27/0025
                                                        348/340
2014/0376105 A1* 12/2014 Sekine .................... G02B 3/02
                                                        359/708
(Continued)

FOREIGN PATENT DOCUMENTS

JP          6919028 B1     8/2021

OTHER PUBLICATIONS

Office Action issued Aug. 10, 2022, on a European Patent No. EP 22162211.

*Primary Examiner* — Balram T Parbadia
*Assistant Examiner* — John Curtis Sipes
(74) *Attorney, Agent, or Firm* — Franklin & Associates International Inc; Matthew F. Lambrinos

(57) ABSTRACT

The optical system includes, a first lens having a positive refractive power, an object side surface thereof being convex near an optical axis, and an image side surface thereof being concave near the optical axis; a second lens having a negative refractive power, an object side surface thereof being convex near the optical axis, and an image side surface thereof being concave near the optical axis; a third lens having a positive refractive power; a fourth lens having a negative refractive power; a fifth lens having a refractive power; a sixth lens having a positive refractive power, an object side surface thereof being convex near the optical axis; a seventh lens having a negative refractive power, an object side surface thereof being convex near the optical axis, and an image side surface thereof being concave near the optical axis; the optical system satisfies the following condition:

$1 \leq TTL/\text{ImgH} \leq 1.12$.

10 Claims, 16 Drawing Sheets

(51) Int. Cl.
*G02B 13/18* (2006.01)
*H04N 23/55* (2023.01)

(58) Field of Classification Search
USPC .......................................................... 359/657
See application file for complete search history.

(56) References Cited

U.S. PATENT DOCUMENTS

| | | | |
|---|---|---|---|
| 2015/0103414 A1* | 4/2015 | Baik | G02B 13/0045 |
| | | | 359/755 |
| 2019/0278063 A1* | 9/2019 | Sekine | G02B 13/0045 |
| 2021/0048646 A1* | 2/2021 | Jung | G02B 9/64 |
| 2021/0157097 A1 | 5/2021 | Hirano | |
| 2021/0157101 A1 | 5/2021 | Yunbai | |
| 2021/0223508 A1* | 7/2021 | Son | G02B 7/022 |
| 2021/0382267 A1* | 12/2021 | Shin | G02B 13/0045 |

* cited by examiner

OPTICAL SYSTEM, IMAGE ACQUISITION MODULE AND ELECTRONIC DEVICE

CROSS-REFERENCE TO RELATED APPLICATION

This application claims priority from Chinese Patent Application No. 202111213926.5, filed on Oct. 19, 2021, the entire contents of which is incorporated herein by reference.

TECHNICAL FIELD

The present disclosure relates to the camera field, in particular, to an optical system, an image acquisition module, and an electronic device.

BACKGROUND

With the rapid development of electronic devices such as smart phones, tablet computers, and e-readers, camera lenses are becoming more and more widely applied in the electronic devices. In order to enhance the market competitiveness of the electronic devices, the industry has further demanded the camera lenses. A camera lens with a miniaturized design is easier to be applied to the electronic device, and is also beneficial to the portable design of the electronic device, while a camera lens with a large image plane characteristic is easy to obtain high imaging quality. However, it is difficult for the current optical system to realize both the miniaturized design and the large image plane characteristic, which is not beneficial to improve the user experience.

SUMMARY

According to various embodiments of the present disclosure, an optical system, an image acquisition module, and an electronic device are provided.

An optical system includes, successively in order from an object side to an image side along an optical axis:
- a first lens having a positive refractive power, an object side surface of the first lens being convex near the optical axis, and an image side surface of the first lens being concave near the optical axis;
- a second lens having a negative refractive power, an object side surface of the second lens being convex near the optical axis, and an image side surface of the second lens being concave near the optical axis;
- a third lens having a positive refractive power;
- a fourth lens having a negative refractive power;
- a fifth lens having a refractive power, an object side surface of the fifth lens being concave near the optical axis;
- a sixth lens having a positive refractive power, an object side surface of the sixth lens being convex near the optical axis;
- a seventh lens having a negative refractive power, an object side surface of the seventh lens being convex near the optical axis, and an image side surface of the seventh lens being concave near the optical axis;
- wherein the optical system satisfies the following condition:

$$1 \leq TTL/\mathrm{ImgH} \leq 1.12;$$

wherein TTL is a distance from the object side surface of the first lens to an imaging plane of the optical system on the optical axis, namely, the total optical length of the optical system, and ImgH is half of an image height corresponding to the maximum angle of field of view of the optical system.

In the above optical system, the first lens has a positive refractive power, and the object side surface of the first lens is convex near the optical axis, which can effectively converge the light, and which is beneficial to shorten the total length of the optical system and realize a miniaturized design. The second lens has a negative refractive power. The object side surface of the second lens is convex near the optical axis, and the image side surface thereof is concave near the optical axis, which is beneficial to suppress the generation of the axial chromatic aberration, thereby improving the imaging quality of the optical system. The cooperation between the convex-concave surface of the second lens and the first lens is also beneficial to further shorten the total length of the optical system. The third lens has a positive refractive power, when cooperating with the positive refractive power of the first lens, it is beneficial to shorten the total length of the optical system, while it is also beneficial to prevent the excessive refractive power of a single lens, thereby reducing the sensitivity of the optical system. The fourth lens has a negative refractive power, which is beneficial to correct the chromatic aberration of magnification. The sixth lens has a positive refractive power, and can correct astigmatism well. The object side surface of the sixth lens is convex near the optical axis, which is beneficial to shorten the total length of the optical system. The seventh lens has a negative refractive power. The object side surface of the seventh lens is convex near the optical axis, and the image side surface thereof is concave near the optical axis, which can well correct the curvature of the image plane. In addition, the seventh lens can cooperate with the positive refractive power of the sixth lens, which is beneficial to shorten the total length of the optical system.

When the above condition is satisfied, a ratio of the total optical length to the half-image height of the optical system can be reasonably configured, which is beneficial to shorten the total length of the optical system, while the optical system has lower sensitivity. In addition, it is also beneficial for the optical system to have a large enough imaging plane to cooperate with a photosensitive element with higher pixels, so that the optical system can capture more details of a subject, thereby improving the imaging quality of the optical system. With the above refractive powers and the surface shape characteristics, and satisfying the above condition, the optical system can realize both the miniaturized design and the large image plane characteristic.

In one of the embodiments, the optical system further satisfies the following conditions:

$$f34<0;$$

$$1 \leq f12/|f34| \leq 4.5;$$

where f12 is a combined focal length of the first lens and the second lens, and f34 is a combined focal length of the third lens and the fourth lens. When the above conditions are satisfied, a ratio of an effective focal length of a first lens group composed of the first lens and the second lens to an effective focal length of a second lens group composed of the third lens and the fourth lens can be reasonably configured, so that the positive refractive power of the first lens group is balanced with the negative refractive power of the second lens group, which is beneficial to the reasonable spatial distribution of the refractive powers of the first lens group and the second lens group, thereby helping to promote the overall aberration balance of the optical system. In turn, it is beneficial to improve the imaging quality of the optical system. When it is not in the range of the above condition, the difference between the positive refractive power assumed by the first lens group and the negative refractive power assumed by the second lens group is too large, which easily disturbs the overall aberration balance of the optical system, resulting in increased aberrations, further resulting in a decrease in the resolution of the optical system.

In one of the embodiments, the optical system further satisfies the following condition:

$$1.5<(f6-f7)/f\leq 3;$$

where f6 is an effective focal length of the sixth lens, f7 is an effective focal length of the seventh lens, and f is an effective focal length of the optical system. When the above condition is satisfied, the refractive powers of the sixth lens and the seventh lens in the optical system can be reasonably configured, which is beneficial for the sixth lens and the seventh lens to effectively correct the spherical aberration generated by the lens on the object side, so that it is beneficial to improve the resolution of the optical system. In addition, it is also beneficial to compress the on-axis sizes of the sixth lens and the seventh lens, thereby facilitating the miniaturized design of the optical system.

In one of the embodiments, the optical system further satisfies the following condition:

$$-17\leq f2/R21\leq -1;$$

where f2 is an effective focal length of the second lens, and R21 is a radius of curvature of the object side surface of the second lens at the optical axis. When the above condition is satisfied, a ratio of the effective focal length of the second lens to the radius of curvature of the object side surface can be reasonably configured, which is beneficial to reduce the complexity of the surface shape of the second lens, thereby avoiding the increase of the distortion of field curvature in a T direction. In addition, the object side surface of the second lens cooperates well with the image side surface of the first lens, which is beneficial to shorten the total length of the optical system. When the lower limit of the above condition is not reached, the negative refractive power provided by the second lens is insufficient, which is not beneficial to the balance of aberrations. When the upper limit of the above condition is exceeded, the image side surface of the second lens is too curved in shape, resulting in an increase in the tolerance sensitivity of the second lens, thereby increasing the difficulty of forming and processing the second lens.

In one of the embodiments, the optical system further satisfies the following condition:

$$1.5\leq R71/R72\leq 3;$$

where R71 is a radius of curvature of the object side surface of the seventh lens at the optical axis, and R72 is a radius of curvature of the image side surface of the seventh lens at the optical axis. When the above condition is satisfied, a ratio of the radius of curvature of the object side surface to the radius of curvature of the image side surface of the seventh lens can be reasonably configured, which is beneficial to reduce the deflection angle of the light transmitting through the object side surface of the seventh lens at the edge field of view. As such, it is beneficial to reduce the sensitivity of the optical system, thereby improving the imaging quality of the optical system. In addition, it is beneficial to shorten the effective focal length of the optical system, thereby helping to increase the aperture of the optical system and increase the luminous flux, so that the optical system can have good imaging quality even in low light conditions. When the lower limit of the above condition is not reached, the radius of curvature of the object side surface of the seventh lens is too small, and the object side surface of the seventh lens is excessively curved in shape, which easily causes the deflection angle of the light to be too large, thereby increasing the sensitivity of the optical system and increasing the risk of ghost images. When the upper limit of the above condition is exceeded, the image side surface of the seventh lens is excessively curved in shape, which easily leads to an excessively long back focus, which is not beneficial to the miniaturization of the optical system.

In one of the embodiments, the optical system further satisfies the following condition:

$$-35\leq R51/ET5\leq -13;$$

where R51 is a radius of curvature of the object side surface of the fifth lens at the optical axis, and ET5 is a distance from a portion of the object side surface at the maximum effective aperture to a portion of an image side surface at the maximum effective aperture of the fifth lens in a direction of the optical axis, that is, an edge thickness of the fifth lens. When the above condition is satisfied, a ratio of the radius of curvature to the edge thickness of the object side surface of the fifth lens can be reasonably configured, which is beneficial to effectively restrict the degree of curvature of the object side surface of the fifth lens and improve the processing feasibility of the fifth lens. In addition, it is beneficial to improve the assembling stability of the optical system, and it is beneficial to shorten the on-axis size of the fifth lens, thereby helping to shorten the total length of the optical system. When the lower limit of the above condition is not reached, the object side surface of the fifth lens is too smooth in shape, which is not beneficial to the correction of aberrations of the optical system, and is likely to cause the degradation of imaging quality. When the upper limit of the above condition is exceeded, the object side surface of the fifth lens is too small in the radius of curvature, and is too curved in shape, which easily leads to a reduction in the forming yield of the fifth lens, and reduces the assembling stability of the optical system.

In one of the embodiments, the optical system further satisfies the following condition:

$$0.5\leq (SD72-SD71)/CT7\leq 1;$$

where SD72 is the maximum effective semi-aperture of the image side surface of the seventh lens, SD71 is the maximum effective semi-aperture of the object side surface of the seventh lens, and CT7 is a thickness of the seventh lens on the optical axis, that is, a center thickness of the seventh lens. When the above condition is satisfied, the maximum effective semi-apertures of the seventh lens on the object side and the image side, and the center thickness of the seventh lens can be reasonably configured, which is beneficial to increase the imaging plane of the optical system, and it is also beneficial to reduce the difficulty of the structure arrangement on the barrel, and it is beneficial to improve the processing feasibility of the seventh lens. When the upper limit of the above condition is exceeded, the difference between the effective apertures of the seventh lens on the object side and the image side is too large, resulting in an increase in the deflection angle of the light at the edge, which increases the risk of ghost images, introduces stray light, and reduces imaging quality. When the lower limit of the above condition is not reached, the difference between the effective apertures of the seventh lens on the object side and the image side is too small, resulting in insufficient relative brightness of the imaging surface, and vignetting tends to occur.

In one of the embodiments, the optical system further satisfies the following condition:

$$1 \leq SAG62/SAG61 \leq 1.5;$$

where SAG62 is a sagittal height of an image side surface of the sixth lens at the maximum effective aperture, that is, a distance from an intersection between the image side surface of the sixth lens and the optical axis to a portion of the image side surface of the sixth lens at the maximum effective aperture; SAG61 is a sagittal height of the object side surface of the sixth lens at the maximum effective aperture, that is, a distance from an intersection between the object side surface of the sixth lens and the optical axis to a portion of the object side surface of the sixth lens at the maximum effective aperture. When the above condition is satisfied, a ratio of the sagittal height of the image side surface to the sagittal height of the object side surface of the sixth lens can be reasonably configured, which is beneficial to restrict the surface shapes of the object side surface and the image side surface of the sixth lens and limit the degree of curvature of the surface shape of the sixth lens, and avoid the difficulty of forming the sixth lens from increasing due to the excessive complexity of the surface shapes. In addition, it is also beneficial to reduce the incidence angle of the chief ray on the imaging plane, so that the optical system is easier to cooperate with the photosensitive element, thereby helping to improve the imaging quality. When the upper limit of the above condition is exceeded, the sagittal height of the image side surface of the sixth lens is too large, and the image side surface of the sixth lens is too curved in shape, which increases the difficulty of forming and processing the sixth lens. When the lower limit of the above condition is not reached, the image side surface of the sixth lens is too smooth, which is not beneficial to correct aberrations, and increase the risk of ghost images, which is not beneficial to improve the imaging quality.

An image acquisition module includes a photosensitive element and the optical system according to any one of the above embodiments. The photosensitive element is arranged on the image side of the optical system. By applying the above optical system in the image acquisition module, the image acquisition module can realize both the miniaturized design and the large image plane characteristic, such that the image acquisition module can be applied in portable electronic devices and have good imaging quality.

An electronic device includes a housing and the image acquisition module as described above. The image acquisition module is located on the housing. The image acquisition module is applied in the electronic device, such that the electronic device can have a portable design, and have good imaging quality, thereby improving the user experience.

DETAILED DESCRIPTION OF THE EMBODIMENTS

Figure 1:
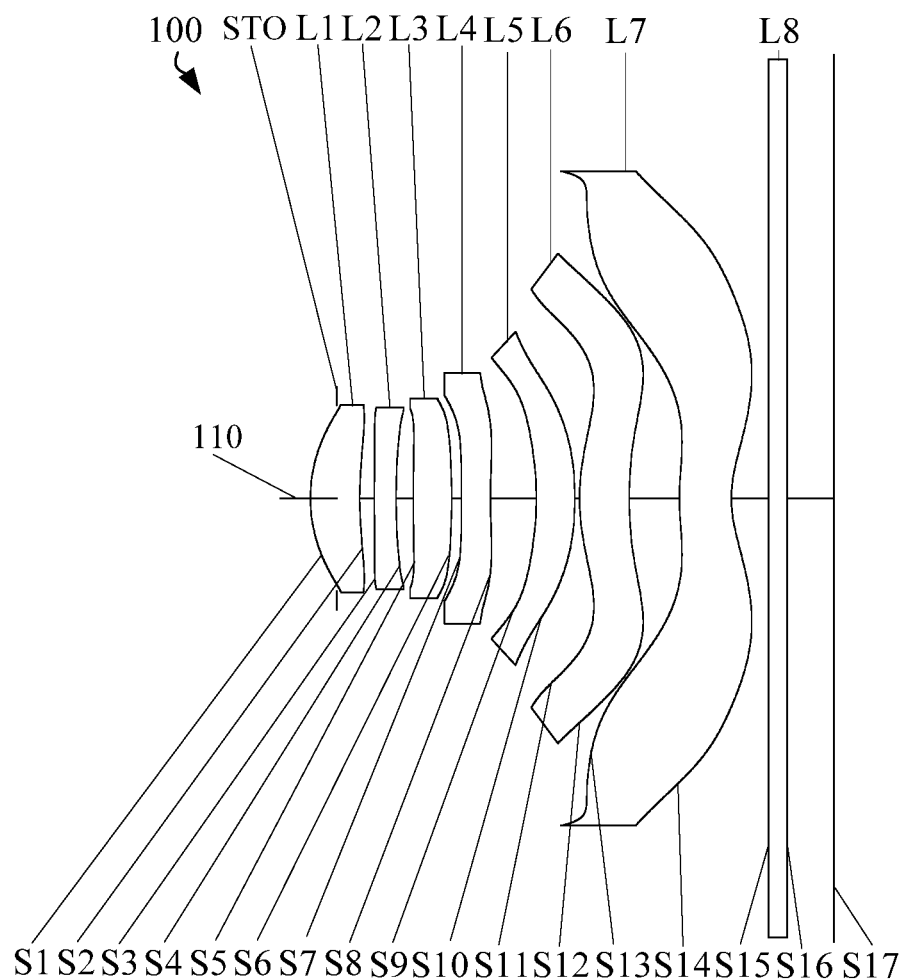
FIG. 1 is a schematic view of an optical system according to a first embodiment of the present disclosure.

In order to enable the above objects, features and advantages of the present disclosure more obvious and understandable, the specific embodiments of the present disclosure will be described in detail below with reference to the accompanying drawings. In the following description, many specific details are illustrated in order to aid in understanding of the present disclosure. However, the present disclosure can be implemented in many other ways different from those described herein, and those skilled in the art can make similar improvements without departing from the connotation of the present disclosure. Therefore, the present disclosure is not limited by the specific embodiments disclosed below.

In the description of the present disclosure, it should be understood that orientational or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" etc. are based on orientation or positional relationships shown in the drawings, which are merely to facilitate the description of the present disclosure and simplify the description, not to indicate or imply that the device or elements should have a particular orientation, be constructed and operated in a particular orientation, and therefore cannot be construed as a limitation on the present disclosure.

In addition, the terms "first" and "second" are used for description only, and cannot be understood as indicating or implying relative importance or implicitly indicating the number of technical features indicated. Thus, the features defined with "first" and "second" may include at least one of the features explicitly or implicitly. In the description of the present disclosure, the meaning of "plurality" is at least two, for example, two, three or the like, unless explicitly and specifically defined otherwise.

In the present disclosure, unless explicitly specified and defined otherwise, terms "mounting", "connecting", "connected", and "fixing" should be understood in a broad sense. For example, it may be a fixed connection or a detachable connection, or an integration; may be a mechanical connection or electrical connection; may be a direct connection, or may be a connection through an intermediate medium, may be the communication between two elements or the interaction between two elements, unless explicitly defined otherwise. The specific meanings of the above terms in the present disclosure can be understood by one of those ordinary skills in the art according to specific circumstances.

In the present disclosure, unless expressly specified and defined otherwise, a first feature being "on" or "below" a second feature may mean that the first feature is in direct contact with the second feature, or may mean that the first feature is in indirect contact with the second feature through an intermediate medium. Moreover, the first feature being "above", "top" and "upside" on the second feature may mean that the first feature is directly above or obliquely above the second feature, or simply mean that the level of the first feature is higher than that of the second feature. The first feature being "below", "under" and "beneath" the second feature may mean that the first feature is directly below or obliquely below the second feature, or simply mean that the level of the first feature is smaller than that of the second feature.

It should be noted that when an element is referred to as being "fixed to" or "provided on" another element, it can be directly on another element or there may be an intermediate element therebetween. When an element is considered to be "connected to" another element, it can be directly connected to another element or there may be an intermediate element therebetween at the same time. The terms "vertical", "horizontal", "upper", "lower", "left", "right", and the like used herein are for illustrative purposes only and are not intended to be the only embodiments.

Referring to FIG. 1, according to some embodiments of the present disclosure, an optical system 100 includes, successively in order from an object side to an image side along an optical axis 110, a first lens L1, a second lens L2, a third lens L3, a fourth lens L4, a fifth lens L5, a sixth lens L6, and a seventh lens L7. Specifically, the first lens L1 includes an object side surface S1 and an image side surface S2. The second lens L2 includes an object side surface S3 and an image side surface S4. The third lens L3 includes an object side surface S5 and an image side surface S6. The fourth lens L4 includes an object side surface S7 and an image side surface S8. The fifth lens L5 includes an object side surface S9 and an image side surface S10. The sixth lens L6 includes an object side surface S11 and an image side surface S12. The seventh lens L7 includes an object side surface S13 and an image side surface S14. The first lens L1, the second lens L2, the third lens L3, the fourth lens L4, the fifth lens L5, the sixth lens L6, and the seventh lens L7 are coaxially arranged. A common axis of the lenses in the optical system 100 is the optical axis 110 of the optical system 100.

The first lens L1 has a positive refractive power, and the object side surface S1 of the first lens L1 is convex near the optical axis 110, which can effectively converge light, and which is beneficial to shorten the total length of the optical system 100 and realize a miniaturized design. The image side surface S2 of the first lens L1 is concave near the optical axis 110. The second lens L2 has a negative refractive power. The object side surface S3 of the second lens L2 is convex near the optical axis 110, and the image side surface S4 thereof is concave near the optical axis 110, which is beneficial to suppress the generation of the axial chromatic aberration, thereby improving the imaging quality of the optical system 100. The cooperation between the convex-concave surface of the second lens L2 and the first lens L1 is also beneficial to further shorten the total length of the optical system 100. The third lens L3 has a positive refractive power, when cooperating with the positive refractive power of the first lens L1, it is beneficial to shorten the total length of the optical system 100, while it is also beneficial to prevent the excessive refractive power of a single lens, thereby reducing the sensitivity of the optical system 100. The fourth lens L4 has a negative refractive power, which is beneficial to correct the chromatic aberration of magnification. The fifth lens L5 has a refractive power, and the object side surface S9 of the fifth lens L5 is concave near the optical axis 110. The sixth lens L6 has a positive refractive power, and can correct astigmatism well. The object side surface S11 of the sixth lens L6 is convex near the optical axis 110, which is beneficial to shorten the total length of the optical system 100. The seventh lens L7 has a negative refractive power. The object side surface S13 of the seventh lens L7 is convex near the optical axis 110, and the image side surface S14 thereof is concave near the optical axis 110, which can well correct the curvature of the image plane. In addition, the seventh lens L7 can cooperate with the positive refractive power of the sixth lens L6, which is beneficial to shorten the total length of the optical system 100.

In some embodiments, at least one of the object side surface S13 and the image side surface S14 of the seventh lens L7 has an inflection point, so that the refractive power distribution on a vertical field of view tends to be balanced, which is beneficial to correct the aberration of the off-axis field of view, improving the imaging quality of the optical system 100.

In addition, in some embodiments, the optical system 100 further includes an imaging plane S17 on an image side of the seventh lens L7. The incident light adjusted by the first lens L1, the second lens L2, the third lens L3, the fourth lens L4, the fifth lens L5, the sixth lens L6, and the seventh lens L7 can be imaged on the imaging plane S17. In some embodiments, the optical system 100 is provided with a stop STO. The stop STO may be arranged on an object side of the first lens L1. In some embodiments, the optical system 100 further includes an infrared filter L8 arranged on the image side of the seventh lens L7. The infrared filter L8 may be an infrared cut-off filter, which is used to filter out interference light, and thus prevent the interference light from reaching the imaging plane S17 of the optical system 100 to affect normal imaging.

In some embodiments, the object side surface and the image side surface of each lens of the optical system 100 are both aspherical. The use of aspherical structure can improve the flexibility of lens design, and effectively correct spherical aberration, and improve imaging quality. In other embodiments, the object side surface and the image side surface of each lens of the optical system 100 may also be spherical. It should be noted that the above-mentioned embodiments are only examples of some embodiments of the present application. In some embodiments, the surfaces of each lens in the optical system 100 may be any combination of aspherical or spherical surfaces.

In some embodiments, the lenses in the optical system 100 may be made of glass or plastic. The lens made of plastic can reduce the weight of the optical system 100 and reduce the production cost, which can realize the thin and light design of the optical system 100 when matched with the small size of the optical system 100. The lens made of glass enables the optical system 100 to have excellent optical performance and higher temperature resistance. It should be noted that the lenses in the optical system 100 can also be made of any combination of glass and plastic, and not necessarily all of them are made of glass or plastic.

It should be noted that the first lens L1 can include more than one lens. In some embodiments, there may also be two or more lenses in the first lens L1, and the two or more lenses can form a cemented lens. A surface of the cemented lens closest to the object side can be regarded as the object side surface S1, and a surface thereof closest to the image side can be regarded as the image side surface S2. Alternatively, the lenses in the first lens L1 does not form the cemented lens, but distances between the lenses are relatively fixed. In this case, the object side surface of the lens closest to the object side is the object side surface S1, and the image side surface of the lens closest to the image side is the image side surface S2. In addition, in some embodiments, two or more lenses may also be arranged in the second lens L2, the third lens L3, the fourth lens L4, the fifth lens L5, the sixth lens L6, or the seventh lens L7. Any adjacent lenses may form the cemented lens, or a non-cemented lens.

Further, in some embodiments, the optical system 100 satisfies a condition: $1 \leq TTL/ImgH \leq 1.12$; where TTL is a distance from the object side surface S1 of the first lens L1 to the imaging plane S17 of the optical system 100 on the optical axis 110, and ImgH is half of the image height corresponding to the maximum angle of field of view of the optical system 100. Specifically, the value of TTL/ImgH can be 1.030, 1.045, 1.052, 1.067, 1.073, 1.084, 1.099, 1.102, 1.113, or 1.120. When the above condition is satisfied, a ratio of the total optical length to the half-image height of the optical system 100 can be reasonably configured, which is beneficial to shorten the total length of the optical system 100, while the optical system 100 has lower sensitivity. In addition, it is also beneficial for the optical system 100 to have a large enough imaging plane to cooperate with a photosensitive element with higher pixels, so that the optical system 100 can capture more details of a subject, thereby improving the imaging quality of the optical system 100. With the above refractive powers and the surface shape characteristics, and satisfying the above condition, the optical system 100 can realize both the miniaturized design and the large image plane characteristic.

It should be noted that, in some embodiments, the optical system 100 may cooperate with a photosensitive element having a rectangular photosensitive surface. An imaging plane S17 of the optical system 100 coincides with a photosensitive surface of the photosensitive element. In this case, an effective pixel area on the imaging plane S17 of the optical system 100 has a horizontal direction and a diagonal direction, and the maximum angle of field of view of the optical system 100 can be understood as the maximum angle of field of view of the optical system 100 in the diagonal direction, and ImgH can be understood as half of the length of the effective pixel area on the imaging plane S17 of the optical system 100 in the diagonal direction.

In some embodiments, the optical system 100 satisfies conditions: $f34<0$; $1 \leq f12/|f34| \leq 4.5$; where f12 is a combined focal length of the first lens L1 and the second lens L2, and f34 is a combined focal length of the third lens L3 and the fourth lens L4. Specifically, the value of $f12/|f34|$ can be: 1.100, 1.152, 1.198, 1.473, 1.866, 2.205, 2.257, 2.638, 2.994, or 4.385. When the above conditions are satisfied, a ratio of an effective focal length of a first lens group composed of the first lens L1 and the second lens L2 to an effective focal length of a second lens group composed of the third lens L3 and the fourth lens L4 can be reasonably configured, so that the positive refractive power of the first lens group is balanced with the negative refractive power of the second lens group, which is beneficial to the reasonable spatial distribution of the refractive powers of the first lens group and the second lens group, thereby helping to promote the overall aberration balance of the optical system 100. In turn, it is beneficial to improve the imaging quality of the optical system 100. When it is not in the range of the above condition, the difference between the positive refractive power assumed by the first lens group and the negative refractive power assumed by the second lens group is too large, which easily disturbs the overall aberration balance of the optical system 100, resulting in increased aberrations, further resulting in a decrease in the resolution of the optical system 100.

In some embodiments, the optical system 100 satisfies a condition: $1.5<(f6-f7)/f \leq 3$; where f6 is an effective focal length of the sixth lens L6, f7 is an effective focal length of the seventh lens L7, and f is an effective focal length of the optical system 100. Specifically, the value of $(f6-|f7|)/f$ can be: 1.856, 1.877, 1.892, 1.955, 2.154, 2.387, 2.555, 2.603, 2.711, or 2.746. When the above condition is satisfied, the refractive powers of the sixth lens L6 and the seventh lens L7 in the optical system 100 can be reasonably configured, which is beneficial for the sixth lens L6 and the seventh lens L7 to effectively correct the spherical aberration generated by the lens on the object side, so that it is beneficial to improve the resolution of the optical system 100. In addition, it is also beneficial to compress the on-axis sizes of the sixth lens L6 and the seventh lens L7, thereby facilitating the miniaturized design of the optical system 100.

In some embodiments, the optical system 100 satisfies a condition: $-17 \leq f2/R21 \leq -1$; where f2 is an effective focal length of the second lens L2, and R21 is a radius of curvature of the object side surface S3 of the second lens L2 at the optical axis 110. Specifically, the value of f2/R21 can be: −16.890, −15.254, −12.360, −10.885, −7.336, −5.120, −4.336, −3.512, −2.558, or −1.997. When the above condition is satisfied, a ratio of the effective focal length of the second lens L2 to the radius of curvature of the object side surface S3 can be reasonably configured, which is beneficial to reduce the complexity of the surface shape of the second lens L2, thereby avoiding the increase of the distortion of field curvature in a T direction. In addition, the object side surface S3 of the second lens L2 cooperates well with the image side surface S2 of the first lens L1, which is beneficial to shorten the total length of the optical system 100. When the lower limit of the above condition is not reached, the negative refractive power provided by the second lens L2 is insufficient, which is not beneficial to the balance of aberrations. When the upper limit of the above condition is exceeded, the image side surface S4 of the second lens L2 is too curved in shape, resulting in an increase in the tolerance sensitivity of the second lens L2, thereby increasing the difficulty of forming and processing the second lens L2.

In some embodiments, the optical system 100 satisfies a condition: $1.5 \leq R71/R72 \leq 3$; where R71 is a radius of curvature of the object side surface S13 of the seventh lens L7 at the optical axis 110, and R72 is a radius of curvature of the image side surface S14 of the seventh lens L7 at the optical axis 110. Specifically, the value of R71/R72 can be: 1.926, 2.025, 2.074, 2.110, 2.164, 2.199, 2.325, 2.398, 2.422, or 2.581. When the above condition is satisfied, a ratio of the radius of curvature of the object side surface S13 to the radius of curvature of the image side surface S14 of the seventh lens L7 can be reasonably configured, which is beneficial to reduce the deflection angle of the light transmitting through the object side surface S13 of the seventh lens L7 at the edge field of view. As such, it is beneficial to reduce the sensitivity of the optical system 100, thereby improving the imaging quality of the optical system 100. In addition, it is beneficial to shorten the effective focal length of the optical system 100, thereby helping to increase the aperture of the optical system 100 and increase the luminous flux, so that the optical system 100 can have good imaging quality even in low light conditions. When the lower limit of the above condition is not reached, the radius of curvature of the object side surface S13 of the seventh lens L7 is too small, and the object side surface S13 of the seventh lens L7 is excessively curved in shape, which easily causes the deflection angle of the light to be too large, resulting in increasing the sensitivity of the optical system 100 and increasing the risk of ghost images. When the upper limit of the above condition is exceeded, the image side surface S14 of the seventh lens L7 is excessively curved in shape, which easily leads to an excessively long back focus, which is not beneficial to the miniaturization of the optical system 100.

In some embodiments, the optical system 100 satisfies a condition: $-35 \leq R51/ET5 \leq -13$; where R51 is a radius of curvature of the object side surface S9 of the fifth lens L5 at the optical axis 110, and ET5 is a distance from a portion of the object side surface S9 at the maximum effective aperture to a portion of the image side surface S10 at the maximum effective aperture of the fifth lens L5 in a direction of the optical axis 110. Specifically, the value of R51/ET5 can be: −33.992, −30.265, −28.614, −25.337, −20.146, −19.555, −17.985, −15.631, −14.320, or −13.910. When the above condition is satisfied, a ratio of the radius of curvature to the edge thickness of the object side surface S9 of the fifth lens L5 can be reasonably configured, which is beneficial to effectively restrict the degree of curvature of the object side surface S9 of the fifth lens L5, improve the processing feasibility of the fifth lens L5, and improve the assembling stability of the optical system 100, while which is beneficial to shorten the on-axis size of the fifth lens L5, thereby helping to shorten the total length of the optical system 100. When the lower limit of the above condition is not reached, the object side surface S9 of the fifth lens L5 is too smooth in shape, which is not beneficial to the correction of aberrations of the optical system 100, and is likely to cause the degradation of imaging quality. When the upper limit of the above condition is exceeded, the object side surface S9 of the fifth lens L5 is too small in the radius of curvature, and is too curved in shape, which easily leads to a reduction in the forming yield of the fifth lens L5, and reduces the assembling stability of the optical system 100.

In some embodiments, the optical system 100 satisfies a condition: $0.5 \leq (SD72-SD71)/CT7 \leq 1$; where SD72 is the maximum effective semi-aperture of the image side surface S14 of the seventh lens L7, SD71 is the maximum effective semi-aperture of the object side surface S13 of the seventh lens L7, and CT7 is a thickness of the seventh lens L7 on the optical axis 110. Specifically, the value of (SD72−SD71)/CT7 can be: 0.682, 0.702, 0.725, 0.738, 0.744, 0.788, 0.796, 0.855, 0.863, or 0.944. When the above condition is satisfied, the maximum effective semi-apertures of the seventh lens L7 on the object side and the image side, and the center thickness of the seventh lens L7 can be reasonably configured, which is beneficial to increase the imaging plane S17 of the optical system 100, and it is also beneficial to reduce the difficulty of the structure arrangement on the barrel, and it is beneficial to improve the processing feasibility of the seventh lens L7. When the upper limit of the above condition is exceeded, the difference between the effective apertures of the seventh lens L7 on the object side and the image side is too large, resulting in an increase in the deflection angle of the light at the edge, which increases the risk of ghost images, introduces stray light, and reduces imaging quality. When the lower limit of the above condition is not reached, the difference between the effective apertures of the seventh lens L7 on the object side and the image side is too small, resulting in insufficient relative brightness of the imaging surface S17, and vignetting tends to occur.

In some embodiments, the optical system 100 satisfies a condition: $1 \leq SAG62/SAG61 \leq 1.5$; where SAG62 is a sagittal height of the image side surface S12 of the sixth lens L6 at the maximum effective aperture, and SAG61 is a sagittal height of the object side surface S11 of the sixth lens L6 at the maximum effective aperture. Specifically, the value of SAG62/SAG61 can be: 1.128, 1.155, 1.182, 1.237, 1.289, 1.305, 1.325, 1.398, 1.433 or 1.486. When the above condition is satisfied, a ratio of the sagittal height of the image side surface S12 to the sagittal height of the object side surface S11 of the sixth lens L6 can be reasonably configured, which is beneficial to restrict the surface shapes of the object side surface S11 and the image side surface S12 of the sixth lens L6, and limit the degree of curvature of the surface shape of the sixth lens L6, and avoid the difficulty of forming the sixth lens L6 from increasing due to the excessive complexity of the surface shapes. In addition, it is also beneficial to reduce the incidence angle of the chief ray on the imaging plane S17, so that the optical system 100 is easier to cooperate with the photosensitive element, thereby helping to improve the imaging quality. When the upper limit of the above condition is exceeded, the sagittal height of the image side surface S12 of the sixth lens L6 is too large, and the image side surface S12 of the sixth lens L6 is too curved in shape, which increases the difficulty of forming and processing the sixth lens L6. When the lower limit of the above condition is not reached, the image side surface S12 of the sixth lens L6 is too smooth, which is not beneficial to correct aberrations, and increase the risk of ghost images, which is not beneficial to improve the imaging quality.

Reference wavelengths of the above effective focal length and combined focal length are 555 nm Based on the description of the foregoing embodiments, more specific embodiments and drawings are illustrated below for detailed description.

First Embodiment

Figure 2:
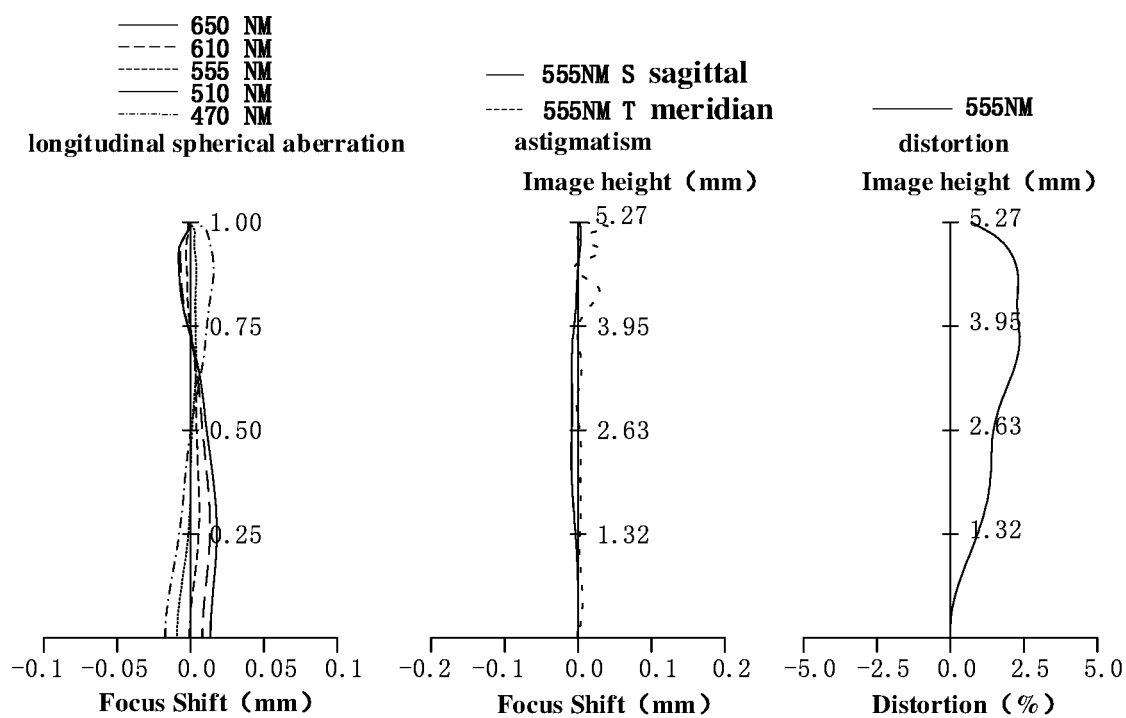
FIG. 2 is a graph showing longitudinal spherical aberration, astigmatism, and distortion of the optical system according to the first embodiment of the present disclosure.

Referring to FIGS. 1 and 2, FIG. 1 is a schematic view of an optical system 100 according to a first embodiment. The optical system 100 includes, successively in order from an object side to an image side, a stop STO, a first lens L1 having a positive refractive power, a second lens L2 having a negative refractive power, a third lens L3 having a positive refractive power, a fourth lens L4 having a negative refractive power, a fifth lens L5 having a negative refractive power, a sixth lens L6 having a positive refractive power, and a seventh lens L7 having a negative refractive power. FIG. 2 is a graph showing longitudinal spherical aberration, astigmatism, and distortion of the optical system 100 according to the first embodiment in order from left to right, where the reference wavelengths of the astigmatism diagram and the distortion diagram are 555 nm, and which are the same in other embodiments.

An object side surface S1 of the first lens L1 is convex near an optical axis 110 and concave at a circumference thereof.

An image side surface S2 of the first lens L1 is concave near the optical axis 110 and convex at the circumference thereof.

An object side surface S3 of the second lens L2 is convex near the optical axis 110 and convex at the circumference thereof.

An image side surface S4 of the second lens L2 is concave near the optical axis 110 and concave at the circumference thereof.

An object side surface S5 of the third lens L3 is convex near the optical axis 110 and concave at the circumference thereof.

An image side surface S6 of the third lens L3 is convex near the optical axis 110 and concave at the circumference thereof.

An object side surface S7 of the fourth lens L4 is convex near the optical axis 110 and concave at the circumference thereof.

An image side surface S8 of the fourth lens L4 is concave near the optical axis 110 and concave at the circumference thereof.

An object side surface S9 of the fifth lens L5 is concave near the optical axis 110 and convex at a circumference thereof.

An image side surface S10 of the fifth lens L5 is convex near the optical axis 110 and concave at the circumference thereof.

An object side surface S11 of the sixth lens L6 is convex near the optical axis 110 and convex at a circumference thereof.

An image side surface S12 of the sixth lens L6 is concave near the optical axis 110 and convex at the circumference thereof.

An object side surface S13 of the seventh lens L7 is convex near the optical axis 110 and convex at a circumference thereof.

An image side surface S14 of the seventh lens L7 is concave near the optical axis 110 and concave at the circumference thereof.

The object side surfaces and the image side surfaces of the first lens L1, the second lens L2, the third lens L3, the fourth lens L4, the fifth lens L5, the sixth lens L6, and the seventh lens L7 are all aspherical.

It should be noted that in this disclosure, when describing that a surface of the lens near the optical axis 110 (a central area of the surface) is convex, it can be understood that an area of this surface of the lens near the optical axis 110 is convex. When describing a surface of the lens is concave at a circumference thereof, it can be understood that an area of this surface approaching the maximum effective radius is concave. For example, when this surface is convex near the optical axis 110 and is also convex at a circumference thereof, a shape of this surface in a direction from its center (an intersection between this surface and the optical axis 110) to its edge may be completely convex, or may be firstly convex at its center and be then transitioned to be concave, and then become convex when approaching the maximum effective radius. These are only examples to illustrate the relationships between various shapes and structures (concave-convex relationships) of the surface at the optical axis 110 and at the circumference, and the various shapes and structures (concave-convex relationships) of the surface are not fully described, but other situations can be derived from the above examples.

The first lens L1, the second lens L2, the third lens L3, the fourth lens L4, the fifth lens L5, the sixth lens L6, and the seventh lens L7 are all made of plastic.

Further, the optical system 100 satisfies a condition: TTL/ImgH=1.112; where TTL is a distance from the object side surface S1 of the first lens L1 to an imaging plane S17 of the optical system 100 on the optical axis 110, and ImgH is half of the image height corresponding to the maximum angle of field of view of the optical system 100. When the above condition is satisfied, a ratio of the total optical length to the half-image height of the optical system 100 can be reasonably configured, which is beneficial to shorten the total length of the optical system 100, while the optical system 100 has lower sensitivity. In addition, it is also beneficial for the optical system 100 to have a large enough imaging plane to cooperate with a photosensitive element with higher pixels, so that the optical system 100 can capture more details of a subject, thereby improving the imaging quality of the optical system 100. With the above refractive powers and the surface shape characteristics, and satisfying the above condition, the optical system 100 can realize both the miniaturized design and the large image plane characteristic.

The optical system 100 satisfies conditions: f34<0; f12/|f34|=2.219; where f12 is a combined focal length of the first lens L1 and the second lens L2, and f34 is a combined focal length of the third lens L3 and the fourth lens L4. When the above conditions are satisfied, a ratio of an effective focal length of a first lens group composed of the first lens L1 and the second lens L2 to an effective focal length of a second lens group composed of the third lens L3 and the fourth lens L4 can be reasonably configured, so that the positive refractive power of the first lens group is balanced with the negative refractive power of the second lens group, which is beneficial to the reasonable spatial distribution of the refractive powers of the first lens group and the second lens group, thereby helping to promote the overall aberration balance of the optical system 100. In turn, it is beneficial to improve the imaging quality of the optical system 100.

The optical system 100 satisfies a condition: (f6−f7)/f=2.736; where f6 is an effective focal length of the sixth lens L6, f7 is an effective focal length of the seventh lens L7, and f is an effective focal length of the optical system 100. When the above condition is satisfied, the refractive powers of the sixth lens L6 and the seventh lens L7 in the optical system 100 can be reasonably configured, which is beneficial for the sixth lens L6 and the seventh lens L7 to effectively correct the spherical aberration generated by the lens on the object side, so that it is beneficial to improve the resolution of the optical system 100. In addition, it is also beneficial to compress the on-axis sizes of the sixth lens L6 and the seventh lens L7, thereby facilitating the miniaturized design of the optical system 100.

The optical system 100 satisfies a condition: f2/R21=−1.997; where f2 is an effective focal length of the second lens L2, and R21 is a radius of curvature of the object side surface S3 of the second lens L2 at the optical axis 110. When the above condition is satisfied, a ratio of the effective focal length of the second lens L2 to the radius of curvature of the object side surface S3 can be reasonably configured, which is beneficial to reduce the complexity of the surface shape of the second lens L2, thereby avoiding the increase of the distortion of field curvature in a T direction. In addition, the object side surface S3 of the second lens L2 cooperates well with the image side surface S2 of the first lens L1, which is beneficial to shorten the total length of the optical system 100.

The optical system 100 satisfies a condition: R71/R72=2.368; where R71 is a radius of curvature of the object side surface S13 of the seventh lens L7 at the optical axis 110, and R72 is a radius of curvature of the image side surface S14 of the seventh lens L7 at the optical axis 110. When the above condition is satisfied, a ratio of the radius of curvature of the object side surface S13 to the radius of curvature of the image side surface S14 of the seventh lens L7 can be reasonably configured, which is beneficial to reduce the deflection angle of the light transmitting through the object side surface S13 of the seventh lens L7 at the edge field of view. As such, it is beneficial to reduce the sensitivity of the optical system 100, thereby improving the imaging quality of the optical system 100. In addition, it is beneficial to shorten the effective focal length of the optical system 100, thereby helping to increase the aperture of the optical system 100 and increase the luminous flux, so that the optical system 100 can have good imaging quality even in low light conditions.

The optical system 100 satisfies a condition: R51/ET5=−13.910; where R51 is a radius of curvature of the object side surface S9 of the fifth lens L5 at the optical axis 110, and ET5 is a distance from a portion of the object side surface S9 at the maximum effective aperture to a portion of the image side surface S10 at the maximum effective aperture of the fifth lens L5 in a direction of the optical axis 110. When the above condition is satisfied, a ratio of the radius of curvature to the edge thickness of the object side surface S9 of the fifth lens L5 can be reasonably configured, which is beneficial to effectively restrict the degree of curvature of the object side surface S9 of the fifth lens L5 and improve the processing feasibility of the fifth lens L5. In addition, the assembling stability of the optical system 100 can be improved, and the on-axis size of the fifth lens L5 is shortened, thereby helping to shorten the total length of the optical system 100. In addition, it is beneficial to correct the aberrations of the optical system 100.

The optical system 100 satisfies a condition: (SD72−SD71)/CT7=0.682; where SD72 is the maximum effective semi-aperture of the image side surface S14 of the seventh lens L7, SD71 is the maximum effective semi-aperture of the object side surface S13 of the seventh lens L7, and CT7 is a thickness of the seventh lens L7 on the optical axis 110. When the above condition is satisfied, the maximum effective semi-apertures of the seventh lens L7 on the object side and the image side, and the center thickness of the seventh lens L7 can be reasonably configured, which is beneficial to increase the imaging plane S17 of the optical system 100, and it is also beneficial to reduce the difficulty of the structure arrangement of the barrel, and it is beneficial to improve the processing feasibility of the seventh lens L7.

The optical system 100 satisfies a condition: SAG62/SAG61=1.486; where SAG62 is a sagittal height of the image side surface S12 of the sixth lens L6 at the maximum effective aperture, and SAG61 is a sagittal height of the object side surface S11 of the sixth lens L6 at the maximum effective aperture. When the above condition is satisfied, a ratio of the sagittal height of the image side surface S12 to the sagittal height of the object side surface S11 of the sixth lens L6 can be reasonably configured, which is beneficial to restrict the surface shapes of the object side surface S11 and the image side surface S12 of the sixth lens L6, and limit the degree of curvature of the surface shape of the sixth lens L6, and avoid the difficulty of forming the sixth lens L6 from increasing due to the excessive complexity of the surface shapes. In addition, it is also beneficial to reduce the incidence angle of the chief ray on the imaging plane S17, so that the optical system 100 is easier to cooperate with the photosensitive element, thereby helping to improve the imaging quality.

In addition, parameters of the optical system 100 are shown in Table 1. The elements from the object plane (not shown in figures) to the imaging plane S17 are arranged in the order of the elements in Table 1 from top to bottom. The Y radius in Table 1 is the radius of curvature of the object side surface or image side surface indicated by corresponding surface number at the optical axis 110. The surface numbers 1 and 2 indicate the object side surface S1 and the image side surface S2 of the first lens L1, respectively. That is, in the same lens, the surface with the smaller surface number is the object side surface, and the surface with the larger surface number is the image side surface. In the "thickness" parameter column of the first lens L1, the first value is the thickness of this lens on the optical axis 110, and the second value is a distance from the image side surface of this lens to the next surface in a direction toward the image side on the optical axis 110.

It should be noted that in this embodiment and the following various embodiments, the optical system 100 may also not be provided with an infrared filter L8, but in this case, a distance from the image side surface S14 of the seventh lens L7 to the imaging plane S17 remains unchanged.

In the first embodiment, the effective focal length of the optical system 100 is indicated by f, and f=4.864 mm. The total optical length is indicated by TTL, and TTL=5.86 mm. The maximum angle of field of view is indicated by FOV, and FOV=94.291 deg. The f-number is indicated by FNO, and FNO=2.199. The optical system 100 can meet the miniaturized design requirements, and have large aperture characteristic and large image plane characteristic, and good imaging quality.

The reference wavelengths of the focal lengths of the lenses are 555 nm, the reference wavelengths of the refractive index, and the Abbe number of each lens are all 587.56 nm, and which are the same in other embodiments.

TABLE 1

First Embodiment
f = 4.864 mm, FNO = 2.199, FOV = 94.291deg, TTL = 5.86 mm

| Surface Number | Surface Name | Surface Shape | Y radius (mm) | Thickness (mm) | Material | Refractive index | Abbe number | Focal Length (mm) |
|---|---|---|---|---|---|---|---|---|
| — | Object Plane | Spherical | Infinite | Infinite | — | — | — | — |
| STO | Stop | Spherical | Infinite | −0.296 | — | — | — | — |
| S1 | First Lens | Aspherical | 1.869 | 0.553 | Plastic | 1.535 | 55.685 | 5.220 |
| S2 | | Aspherical | 5.075 | 0.161 | | | | |
| S3 | Second Lens | Aspherical | 12.253 | 0.245 | Plastic | 1.671 | 19.239 | −24.475 |
| S4 | | Aspherical | 6.960 | 0.195 | | | | |
| S5 | Third Lens | Aspherical | 56.831 | 0.428 | Plastic | 1.535 | 55.685 | 13.957 |
| S6 | | Aspherical | −8.571 | 0.107 | | | | |
| S7 | Fourth Lens | Aspherical | 34.809 | 0.327 | Plastic | 1.671 | 19.239 | −17.698 |
| S8 | | Aspherical | 8.819 | 0.514 | | | | |
| S9 | Fifth Lens | Aspherical | −3.748 | 0.430 | Plastic | 1.567 | 37.400 | −66.436 |
| S10 | | Aspherical | −4.335 | 0.052 | | | | |
| S11 | Sixth Lens | Aspherical | 2.535 | 0.558 | Plastic | 1.535 | 55.685 | 8.036 |
| S12 | | Aspherical | 5.708 | 0.561 | | | | |
| S13 | Seventh Lens | Aspherical | 3.469 | 0.580 | Plastic | 1.535 | 55.685 | −5.273 |
| S14 | | Aspherical | 1.465 | 0.416 | | | | |
| S15 | Infrared Filter | Spherical | Infinite | 0.210 | Glass | 1.517 | 64.166 | — |
| S16 | | Spherical | Infinite | 0.523 | | | | |
| S17 | Imaging Plane | Spherical | Infinite | 0.000 | — | — | — | — |

Further, the aspheric coefficients of the image side surface or the object side surface of each of the lenses of the optical system 100 are shown in Table 2. The surface numbers of S1 to S14 indicate the image side surface or the object side surface S1 to S14, respectively. K to A20 from top to bottom respectively represent the types of aspherical coefficients, where K represents the conic coefficient, A4 represents the fourth-order aspheric coefficient, A6 represents the sixth-order aspheric coefficient, and A8 represents the eighth-order aspheric coefficient, and so on. In addition, the aspheric coefficient formula is as follows:

$$Z = \frac{cr^2}{1 + \sqrt{1-(k+1)c^2r^2}} + \sum_i A_i r^i$$

where Z is a distance from a corresponding point on an aspheric surface to a plane tangent to a vertex of the surface, r is a distance from a corresponding point on the aspheric surface to the optical axis 110, c is a curvature of the vertex of the aspheric surface, k is a conic coefficient, and Ai is a coefficient corresponding to the $i^{th}$ high-order term in the aspheric surface shape formula.

TABLE 2

| Surface Number | S1 | S2 | S3 | S4 | S5 | S6 | S7 |
|---|---|---|---|---|---|---|---|
| K | −8.593E−01 | 1.728E+01 | 7.150E+01 | 2.554E+01 | −9.800E+01 | 3.849E+01 | 9.800E+01 |
| A4 | 1.381E−02 | −5.562E−02 | −7.449E−02 | −4.008E−02 | 3.183E−02 | 2.456E−02 | −1.016E−01 |
| A6 | 2.229E−02 | −3.123E−03 | 2.919E−02 | −4.495E−03 | −9.349E−02 | 1.823E−02 | 7.784E−02 |
| A8 | −1.043E−01 | −1.210E−01 | −6.519E−02 | 8.314E−02 | 2.800E−01 | −2.425E−01 | −3.413E−01 |
| A10 | 2.981E−01 | 4.900E−01 | 3.304E−01 | −1.140E−01 | −1.006E+00 | 6.601E−01 | 8.405E−01 |
| A12 | −5.544E−01 | −1.179E+00 | −6.821E−01 | 1.400E−01 | 2.331E+00 | −1.138E+00 | −1.341E+00 |
| A14 | 6.466E−01 | 1.714E+00 | 8.658E−01 | −1.184E−01 | −3.440E+00 | 1.242E+00 | 1.407E+00 |
| A16 | −4.630E−01 | −1.496E+00 | −7.055E−01 | 4.139E−02 | 3.090E+00 | −8.463E−01 | −9.393E−01 |
| A18 | 1.833E−01 | 7.167E−01 | 3.377E−01 | 0.000E+00 | −1.557E+00 | 3.244E−01 | 3.606E−01 |
| A20 | −3.083E−02 | −1.452E−01 | −7.046E−02 | 0.000E+00 | 3.374E−01 | −5.204E−02 | −5.991E−02 |

| Surface Number | S8 | S9 | S10 | S11 | S12 | S13 | S14 |
|---|---|---|---|---|---|---|---|
| K | −9.590E+01 | 1.576E+00 | 8.483E−01 | −2.011E+01 | −1.157E+01 | −2.490E+01 | −6.190E+00 |
| A4 | −6.722E−02 | 3.170E−02 | −1.195E−01 | 3.757E−02 | 4.903E−02 | −1.573E−01 | −8.029E−02 |
| A6 | 2.223E−02 | −2.253E−02 | 1.595E−01 | −4.004E−02 | −3.495E−02 | 7.233E−02 | 3.218E−02 |
| A8 | −4.467E−02 | 6.292E−02 | −1.611E−01 | 6.643E−03 | 2.422E−03 | −2.498E−02 | −9.922E−03 |
| A10 | 3.071E−02 | −1.315E−01 | 1.131E−01 | −1.660E−04 | 3.603E−03 | 5.892E−03 | 2.009E−03 |
| A12 | 1.863E−02 | 1.301E−01 | −5.658E−02 | 5.242E−06 | −1.666E−03 | −8.854E−04 | −2.540E−04 |
| A14 | −4.524E−02 | −7.414E−02 | 1.965E−02 | −3.410E−04 | 3.553E−04 | 8.351E−05 | 1.978E−05 |
| A16 | 3.217E−02 | 2.492E−02 | −4.347E−03 | 7.983E−05 | −4.141E−05 | −4.804E−06 | −9.212E−07 |
| A18 | −1.030E−02 | −4.553E−03 | 5.383E−04 | −8.303E−06 | 2.538E−06 | 1.545E−07 | 2.354E−08 |
| A20 | 1.246E−03 | 3.473E−04 | −2.817E−05 | 3.244E−07 | −6.407E−08 | −2.132E−09 | −2.541E−10 |

In addition, FIG. 2 includes a longitudinal spherical aberration diagram of the optical system 100, which shows that the convergence points of light of different wavelengths deviate from the focal point after transmitting through the lenses. The ordinate of the longitudinal spherical aberration diagram represents the normalized pupil coordinator from the center of the pupil to the edge of the pupil, and the abscissa thereof represents the focus shift, that is, the distance from the imaging plane S17 to the intersection of the light and the optical axis 110 (in unit of mm) It can be seen from the longitudinal spherical aberration diagram that the deviation degrees of the convergence points of the light of various wavelength in the first embodiment tends to be the same, and the diffuse spots or chromatic halos in the imaged pictures are effectively prevented. FIG. 2 further includes an astigmatic field curves diagram of the optical system 100, where the abscissa thereof represents the focus shift, and the ordinate thereof represents the image height, in a unit of mm. In the astigmatic field curves diagram, the S curve represents the sagittal field curvature at 555 nm, and the T curve represents the meridian field curvature at 555 nm. It can be seen from the figure that the field curvature of the optical system 100 is small, the field curvature and astigmatism of each field of view are well corrected, and clear imaging can be achieved at the center and edges of the field of view. FIG. 2 further includes a distortion diagram of the optical system 100. The distortion represents the value of the distortion corresponding to different angles of field of view, where the abscissa thereof represents the distortion value in a unit of %, and the ordinate thereof represents the image height in a unit of mm. It can be seen from the figure that the image distortion caused by the main beam is small, and the imaging quality of the system is excellent.

Second Embodiment

Figure 3:
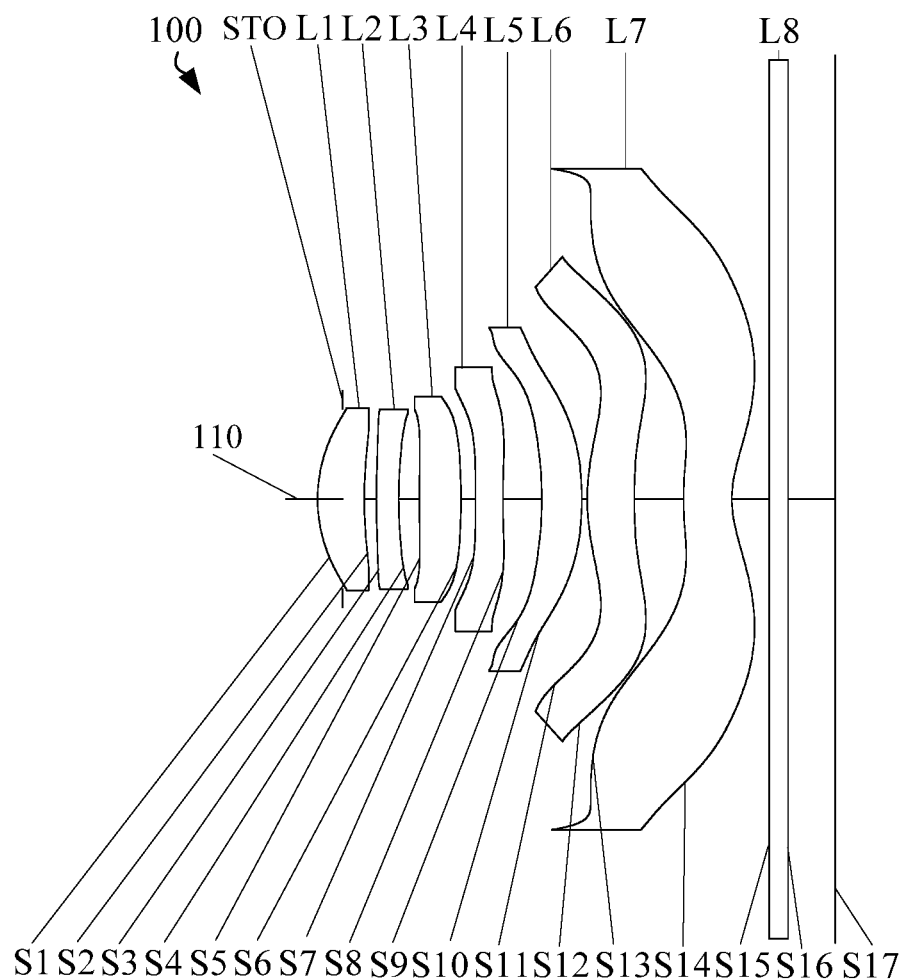
FIG. 3 is a schematic view of an optical system according to a second embodiment of the present disclosure.
Figure 4:
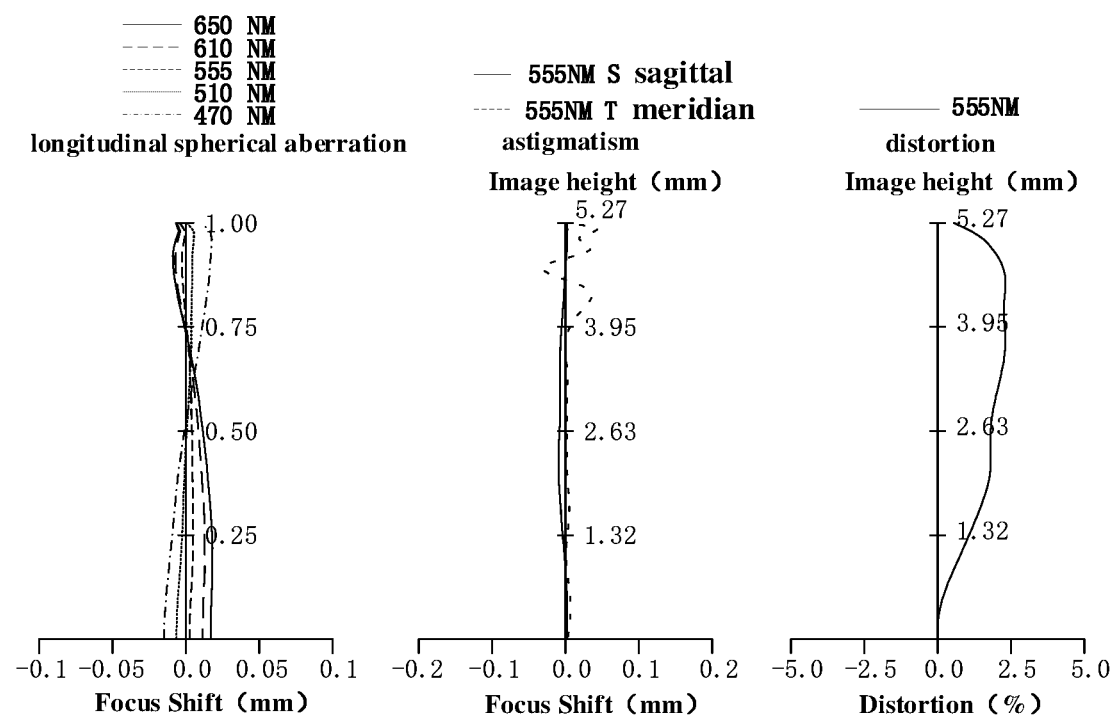
FIG. 4 is a graph showing longitudinal spherical aberration, astigmatism, and distortion of the optical system according to the second embodiment of the present disclosure.

Referring to FIGS. 3 and 4, FIG. 3 is a schematic view of an optical system 100 according to a second embodiment. The optical system 100 includes, successively in order from an object side to an image side, a stop STO, a first lens L1 having a positive refractive power, a second lens L2 having a negative refractive power, a third lens L3 having a positive refractive power, a fourth lens L4 having a negative refractive power, a fifth lens L5 having a positive refractive power, a sixth lens L6 having a positive refractive power, and a seventh lens L7 having a negative refractive power. FIG. 4 is a graph showing longitudinal spherical aberration, astigmatism, and distortion of the optical system 100 according to the second embodiment in order from left to right.

An object side surface S1 of the first lens L1 is convex near an optical axis 110 and concave at a circumference thereof.

An image side surface S2 of the first lens L1 is concave near the optical axis 110 and convex at the circumference thereof.

An object side surface S3 of the second lens L2 is convex near the optical axis 110 and convex at a circumference thereof.

An image side surface S4 of the second lens L2 is concave near the optical axis 110 and concave at the circumference thereof.

An object side surface S5 of the third lens L3 is convex near the optical axis 110 and concave at a circumference thereof.

An image side surface S6 of the third lens L3 is convex near the optical axis 110 and concave at the circumference thereof.

An object side surface S7 of the fourth lens L4 is convex near the optical axis 110 and concave at a circumference thereof.

An image side surface S8 of the fourth lens L4 is concave near the optical axis 110 and concave at the circumference thereof.

An object side surface S9 of the fifth lens L5 is concave near the optical axis 110 and convex at a circumference thereof.

An image side surface S10 of the fifth lens L5 is convex near the optical axis 110 and convex at the circumference thereof.

An object side surface S11 of the sixth lens L6 is convex near the optical axis 110 and convex at a circumference thereof.

An image side surface S12 of the sixth lens L6 is concave near the optical axis 110 and concave at the circumference thereof.

An object side surface S13 of the seventh lens L7 is convex near the optical axis 110 and convex at a circumference thereof.

An image side surface S14 of the seventh lens L7 is concave near the optical axis 110 and convex at the circumference thereof.

The object side surfaces and the image side surfaces of the first lens L1, the second lens L2, the third lens L3, the fourth lens L4, the fifth lens L5, the sixth lens L6, and the seventh lens L7 are all aspherical.

The first lens L1, the second lens L2, the third lens L3, the fourth lens L4, the fifth lens L5, the sixth lens L6, and the seventh lens L7 are all made of plastic.

In addition, various parameters of the optical system 100 are shown in Table 3, and the definition of each of the parameters can be obtained from the first embodiment, which will not be repeated herein.

TABLE 3

Second Embodiment
f = 4.715 mm, FNO = 2.199, FOV = 96.174deg, TTL = 5.78 mm

| Surface Number | Surface Name | Surface Shape | Y radius (mm) | Thickness (mm) | Material | Refractive index | Abbe number | Focal Length (mm) |
|---|---|---|---|---|---|---|---|---|
| — | Object Plane | Spherical | Infinite | Infinite | — | — | — | — |
| STO | Stop | Spherical | Infinite | −0.278 | — | — | — | — |
| S1 | First | Aspherical | 1.878 | 0.520 | Plastic | 1.535 | 55.685 | 5.427 |
| S2 | Lens | Aspherical | 4.806 | 0.136 | | | | |
| S3 | Second | Aspherical | 9.367 | 0.250 | Plastic | 1.671 | 19.239 | −27.680 |
| S4 | Lens | Aspherical | 6.159 | 0.232 | | | | |
| S5 | Third | Aspherical | 42.990 | 0.464 | Plastic | 1.535 | 55.685 | 13.260 |

TABLE 3-continued

Second Embodiment
f = 4.715 mm, FNO = 2.199, FOV = 96.174deg, TTL = 5.78 mm

| Surface Number | Surface Name | Surface Shape | Y radius (mm) | Thickness (mm) | Material | Refractive index | Abbe number | Focal Length (mm) |
|---|---|---|---|---|---|---|---|---|
| S6 | Lens | Aspherical | −8.460 | 0.159 | | | | |
| S7 | Fourth | Aspherical | 90.485 | 0.309 | Plastic | 1.671 | 19.239 | −15.442 |
| S8 | Lens | Aspherical | 9.281 | 0.434 | | | | |
| S9 | Fifth | Aspherical | −4.431 | 0.445 | Plastic | 1.567 | 37.400 | 287.859 |
| S10 | Lens | Aspherical | −4.471 | 0.062 | | | | |
| S11 | Sixth | Aspherical | 2.672 | 0.525 | Plastic | 1.535 | 55.685 | 7.188 |
| S12 | Lens | Aspherical | 8.161 | 0.549 | | | | |
| S13 | Seventh | Aspherical | 3.178 | 0.540 | Plastic | 1.535 | 55.685 | −4.714 |
| S14 | Lens | Aspherical | 1.323 | 0.419 | | | | |
| S15 | Infrared | Spherical | Infinite | 0.210 | Glass | 1.517 | 64.166 | — |
| S16 | Filter | Spherical | Infinite | 0.526 | | | | |
| S17 | Imaging Plane | Spherical | Infinite | 0.000 | — | — | — | — |

Further, the aspheric coefficients of the image side surface or the object side surface of each of the lenses of the optical system 100 are shown in Table 4, and the definition of each of the parameters can be obtained from the first embodiment, and will not be repeated herein.

TABLE 4

| Surface Number | S1 | S2 | S3 | S4 | S5 | S6 | S7 |
|---|---|---|---|---|---|---|---|
| K | −8.343E−01 | 1.617E+01 | 5.496E+01 | 2.581E+01 | −6.410E+01 | 4.105E+01 | −9.800E+01 |
| A4 | 1.428E−02 | −5.999E−02 | −7.304E−02 | −3.931E−02 | 4.844E−04 | −3.413E−03 | −9.561E−02 |
| A6 | 2.143E−02 | 3.230E−03 | 4.083E−02 | 1.572E−02 | −6.121E−02 | −3.761E−02 | −1.372E−02 |
| A8 | −1.081E−01 | −1.738E−01 | −1.677E−01 | 2.229E−02 | 2.277E−01 | 9.501E−02 | 6.690E−02 |
| A10 | 3.399E−01 | 7.423E−01 | 7.543E−01 | −9.246E−04 | −9.097E−01 | −2.719E−01 | −1.914E−01 |
| A12 | −6.808E−01 | −1.866E+00 | −1.773E+00 | −5.808E−03 | 2.187E+00 | 4.609E−01 | 3.487E−01 |
| A14 | 8.446E−01 | 2.823E+00 | 2.544E+00 | −1.642E−02 | −3.312E+00 | −5.102E−01 | −3.783E−01 |
| A16 | −6.365E−01 | −2.554E+00 | −2.227E+00 | 1.280E−02 | 3.048E+00 | 3.468E−01 | 2.327E−01 |
| A18 | 2.635E−01 | 1.267E+00 | 1.090E+00 | 0.000E+00 | −1.570E+00 | −1.321E−01 | −7.282E−02 |
| A20 | −4.619E−02 | −2.657E−01 | −2.271E−01 | 0.000E+00 | 3.476E−01 | 2.229E−02 | 8.825E−03 |

| Surface Number | S8 | S9 | S10 | S11 | S12 | S13 | S14 |
|---|---|---|---|---|---|---|---|
| K | −7.618E+01 | 2.123E+00 | 1.082E+00 | −1.626E+01 | −3.956E+00 | −2.617E+01 | −5.719E+00 |
| A4 | −6.592E−02 | 1.914E−02 | −1.271E−01 | 1.863E−02 | 7.202E−02 | −1.638E−01 | −8.485E−02 |
| A6 | 1.391E−02 | 1.925E−02 | 1.489E−01 | −1.720E−02 | −6.225E−02 | 7.232E−02 | 3.461E−02 |
| A8 | −2.537E−02 | −2.225E−02 | −1.263E−01 | −1.483E−02 | 1.860E−02 | −2.396E−02 | −1.025E−02 |
| A10 | 1.374E−02 | −2.301E−02 | 7.041E−02 | 1.310E−02 | −2.324E−03 | 5.546E−03 | 1.971E−03 |
| A12 | 1.957E−02 | 3.992E−02 | −2.681E−02 | −4.617E−03 | −2.513E−04 | −8.263E−04 | −2.386E−04 |
| A14 | −3.317E−02 | −2.431E−02 | 7.434E−03 | 8.770E−04 | 1.333E−04 | 7.751E−05 | 1.798E−05 |
| A16 | 2.059E−02 | 7.561E−03 | −1.440E−03 | −8.991E−05 | −1.919E−05 | −4.438E−06 | −8.177E−07 |
| A18 | −5.861E−03 | −1.182E−03 | 1.670E−04 | 4.427E−06 | 1.250E−06 | 1.420E−07 | 2.063E−08 |
| A20 | 6.321E−04 | 7.320E−05 | −8.460E−06 | −7.088E−08 | −3.122E−08 | −1.949E−09 | −2.230E−10 |

According to the information of parameters described above, the following data can be derived.

| TTL/ImgH | 1.097 | R71/R72 | 2.403 |
|---|---|---|---|
| f12/|f34| | 1.479 | R51/ET5 | −18.457 |
| (f6−f7)/f | 2.524 | (SD72−SD71)/CT7 | 0.744 |
| f2/R21 | −2.955 | SAG62/SAG61 | 1.390 |

In addition, it can be seen from the aberration diagram in FIG. 4 that the longitudinal spherical aberration, astigmatism, and distortion of the optical system 100 are well controlled, such that the optical system 100 of this embodiment has good imaging quality.

Third Embodiment

Figure 5:
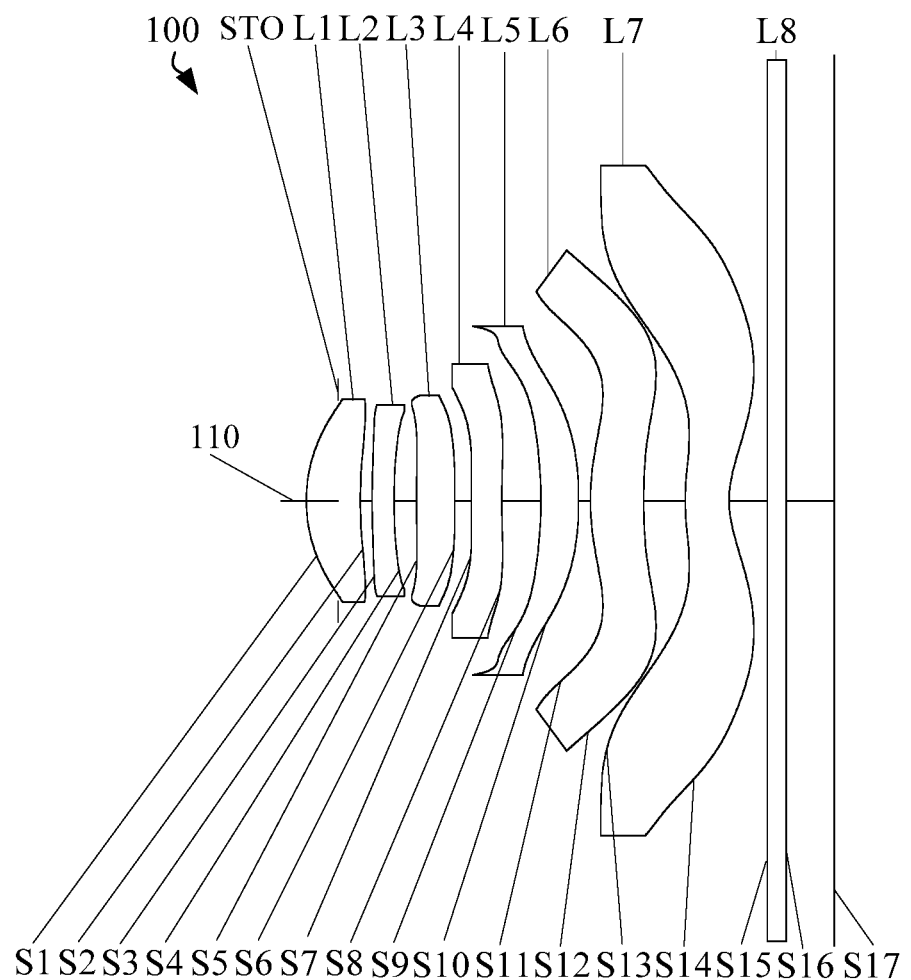
FIG. 5 is a schematic view of an optical system according to a third embodiment of the present disclosure.
Figure 6:
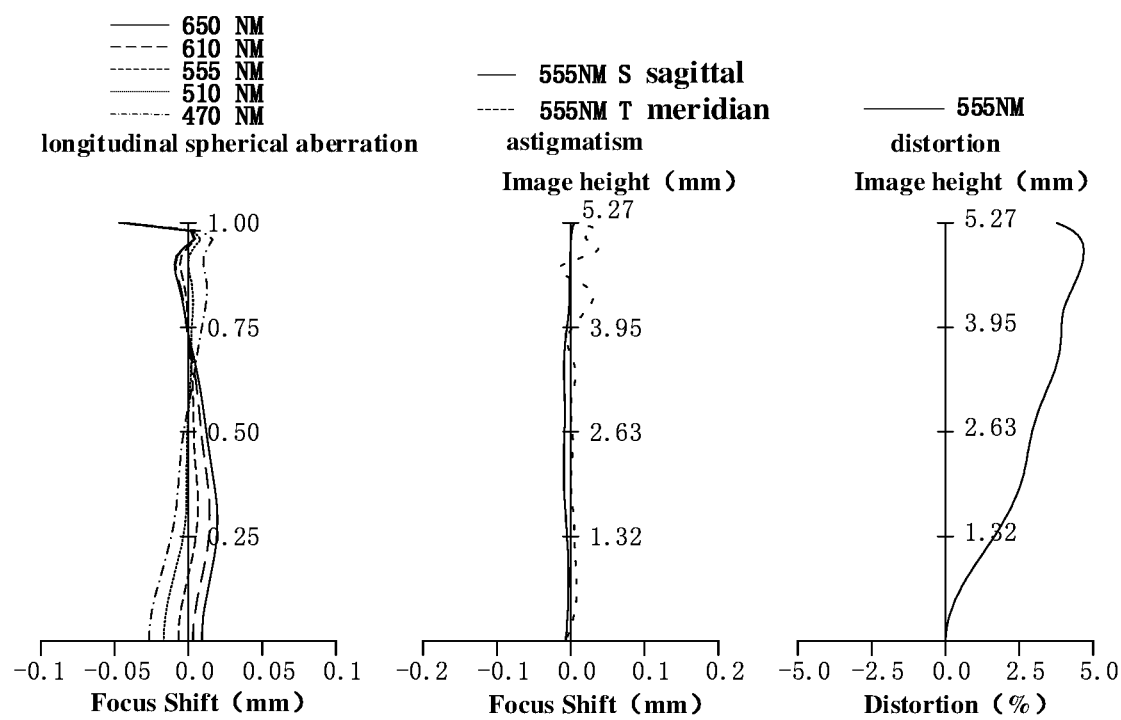
FIG. 6 is a graph showing longitudinal spherical aberration, astigmatism, and distortion of the optical system according to the third embodiment of the present disclosure.

Referring to FIGS. 5 and 6, FIG. 5 is a schematic view of an optical system 100 according to a third embodiment. The optical system 100 includes, successively in order from an object side to an image side, a stop STO, a first lens L1 having a positive refractive power, a second lens L2 having a negative refractive power, a third lens L3 having a positive refractive power, a fourth lens L4 having a negative refractive power, a fifth lens L5 having a positive refractive power, a sixth lens L6 having a positive refractive power, and a seventh lens L7 having a negative refractive power. FIG. 6 is a graph showing longitudinal spherical aberration, astigmatism, and distortion of the optical system 100 according to the third embodiment in order from left to right.

An object side surface S1 of the first lens L1 is convex near an optical axis 110 and concave at a circumference thereof.

An image side surface S2 of the first lens L1 is concave near the optical axis 110 and convex at the circumference thereof.

An object side surface S3 of the second lens L2 is convex near the optical axis 110 and convex at a circumference thereof.

An image side surface S4 of the second lens L2 is concave near the optical axis 110 and concave at the circumference thereof.

An object side surface S5 of the third lens L3 is convex near the optical axis 110 and convex at a circumference thereof.

An image side surface S6 of the third lens L3 is convex near the optical axis 110 and concave at the circumference thereof.

An object side surface S7 of the fourth lens L4 is convex near the optical axis 110 and concave at a circumference thereof.

An image side surface S8 of the fourth lens L4 is concave near the optical axis 110 and concave at the circumference thereof.

An object side surface S9 of the fifth lens L5 is concave near the optical axis 110 and convex at a circumference thereof.

An image side surface S10 of the fifth lens L5 is convex near the optical axis 110 and concave at the circumference thereof.

An object side surface S11 of the sixth lens L6 is convex near the optical axis 110 and convex at a circumference thereof.

An image side surface S12 of the sixth lens L6 is concave near the optical axis 110 and convex at the circumference thereof.

An object side surface S13 of the seventh lens L7 is convex near the optical axis 110 and concave at a circumference thereof.

An image side surface S14 of the seventh lens L7 is concave near the optical axis 110 and convex at the circumference thereof.

The object side surfaces and the image side surfaces of the first lens L1, the second lens L2, the third lens L3, the fourth lens L4, the fifth lens L5, the sixth lens L6, and the seventh lens L7 are all aspherical.

The first lens L1, the second lens L2, the third lens L3, the fourth lens L4, the fifth lens L5, the sixth lens L6, and the seventh lens L7 are all made of plastic.

In addition, various parameters of the optical system 100 are shown in Table 5, and the definition of each of the parameters can be obtained from the first embodiment, which will not be repeated herein.

TABLE 5

Third Embodiment
f = 4.784 mm, FNO = 2, FOV = 93.492deg, TTL = 5.88 mm

| Surface Number | Surface Name | Surface Shape | Y radius (mm) | Thickness (mm) | Material | Refractive index | Abbe number | Focal Length (mm) |
|---|---|---|---|---|---|---|---|---|
| — | Object Plane | Spherical | Infinite | Infinite | — | — | — | — |
| STO | Stop | Spherical | Infinite | −0.354 | — | — | — | — |
| S1 | First Lens | Aspherical | 1.907 | 0.601 | Plastic | 1.535 | 55.685 | 5.273 |
| S2 |  | Aspherical | 5.240 | 0.133 |  |  |  |  |
| S3 | Second Lens | Aspherical | 10.359 | 0.243 | Plastic | 1.671 | 19.239 | −23.541 |
| S4 |  | Aspherical | 6.196 | 0.251 |  |  |  |  |
| S5 | Third Lens | Aspherical | 31.034 | 0.428 | Plastic | 1.535 | 55.685 | 17.698 |
| S6 |  | Aspherical | −13.553 | 0.186 |  |  |  |  |
| S7 | Fourth Lens | Aspherical | 51.106 | 0.338 | Plastic | 1.671 | 19.239 | −21.360 |
| S8 |  | Aspherical | 11.160 | 0.434 |  |  |  |  |
| S9 | Fifth Lens | Aspherical | −5.506 | 0.420 | Plastic | 1.567 | 37.400 | 151.833 |
| S10 |  | Aspherical | −5.318 | 0.131 |  |  |  |  |
| S11 | Sixth Lens | Aspherical | 2.915 | 0.594 | Plastic | 1.535 | 55.685 | 7.891 |
| S12 |  | Aspherical | 8.754 | 0.462 |  |  |  |  |
| S13 | Seventh Lens | Aspherical | 2.729 | 0.490 | Plastic | 1.535 | 55.685 | −5.245 |
| S14 |  | Aspherical | 1.297 | 0.427 |  |  |  |  |
| S15 | Infrared Filter | Spherical | Infinite | 0.210 | Glass | 1.517 | 64.166 |  |
| S16 |  | Spherical | Infinite | 0.533 |  |  |  |  |
| S17 | Imaging Plane | Spherical | Infinite | 0.000 | — | — | — | — |

Further, the aspheric coefficients of the image side surface or the object side surface of each of the lenses of the optical system 100 are shown in Table 6, and the definition of each of the parameters can be obtained from the first embodiment, and will not be repeated herein.

TABLE 6

| Surface Number | S1 | S2 | S3 | S4 | S5 | S6 | S7 |
|---|---|---|---|---|---|---|---|
| K | −6.980E−01 | 1.621E+01 | 6.732E+01 | 2.549E+01 | −9.800E+01 | 5.847E+01 | −9.800E+01 |
| A4 | 1.175E−02 | −4.901E−02 | −6.029E−02 | −3.367E−02 | −1.232E−02 | −1.580E−02 | −8.449E−02 |
| A6 | 1.252E−02 | 4.819E−04 | 2.388E−02 | 1.969E−02 | −9.678E−03 | −5.247E−02 | 2.193E−02 |
| A8 | −2.971E−02 | −7.662E−02 | −1.458E−02 | 1.432E−02 | −3.536E−02 | 1.730E−01 | −8.743E−02 |
| A10 | 3.762E−02 | 2.927E−01 | 9.539E−02 | −4.962E−03 | 5.692E−02 | −4.545E−01 | 1.664E−01 |
| A12 | −9.582E−03 | −6.377E−01 | −1.893E−01 | −6.249E−03 | −3.359E−02 | 7.090E−01 | −1.697E−01 |
| A14 | −3.830E−02 | 8.232E−01 | 2.052E−01 | −9.880E−04 | −9.170E−02 | −6.974E−01 | 9.136E−02 |
| A16 | 4.963E−02 | −6.341E−01 | −1.367E−01 | 3.898E−03 | 1.904E−01 | 4.161E−01 | −2.340E−02 |
| A18 | −2.563E−02 | 2.684E−01 | 5.565E−02 | 0.000E+00 | −1.439E−01 | −1.364E−01 | 2.975E−03 |
| A20 | 4.907E−03 | −4.822E−02 | −1.067E−02 | 0.000E+00 | 4.125E−02 | 1.909E−02 | −4.198E−04 |

TABLE 6-continued

| Surface Number | S8 | S9 | S10 | S11 | S12 | S13 | S14 |
|---|---|---|---|---|---|---|---|
| K | −8.427E+01 | 2.341E+00 | 1.504E+00 | −1.716E+01 | 2.023E+00 | −1.939E+01 | −5.202E+00 |
| A4 | −5.367E−02 | −2.620E−03 | −1.163E−01 | 1.447E−02 | 6.430E−02 | −1.322E−01 | −8.040E−02 |
| A6 | 1.543E−02 | 4.300E−02 | 1.241E−01 | −2.143E−02 | −4.842E−02 | 4.913E−02 | 3.082E−02 |
| A8 | −3.953E−02 | −5.324E−02 | −9.579E−02 | 1.905E−04 | 1.091E−02 | −1.353E−02 | −9.077E−03 |
| A10 | 4.065E−02 | 1.796E−02 | 4.746E−02 | −3.319E−04 | −3.327E−05 | 2.674E−03 | 1.778E−03 |
| A12 | −1.405E−02 | 4.003E−03 | −1.625E−02 | 1.407E−03 | −6.347E−04 | −3.473E−04 | −2.193E−04 |
| A14 | −6.343E−03 | −5.286E−03 | 4.307E−03 | −6.578E−04 | 1.673E−04 | 2.870E−05 | 1.669E−05 |
| A16 | 7.509E−03 | 1.737E−03 | −8.469E−04 | 1.348E−04 | −2.051E−05 | −1.453E−06 | −7.591E−07 |
| A18 | −2.442E−03 | −2.390E−04 | 1.019E−04 | −1.319E−05 | 1.258E−06 | 4.118E−08 | 1.895E−08 |
| A20 | 2.718E−04 | 1.091E−05 | −5.333E−06 | 5.014E−07 | −3.113E−08 | −5.006E−10 | −2.005E−10 |

According to the information of parameters described above, the following data can be derived.

| | | | |
|---|---|---|---|
| TTL/ImgH | 1.116 | R71/R72 | 2.105 |
| f12/|f34| | 2.663 | R51/ET5 | −21.085 |
| (f6-f7)/f | 2.746 | (SD72-SD71)/CT7 | 0.752 |
| f2/R21 | −2.273 | SAG62/SAG61 | 1.423 |

In addition, it can be seen from the aberration diagram in FIG. 6 that the longitudinal spherical aberration, astigmatism, and distortion of the optical system 100 are well controlled, such that the optical system 100 of this embodiment has good imaging quality.

Fourth Embodiment

Figure 7:
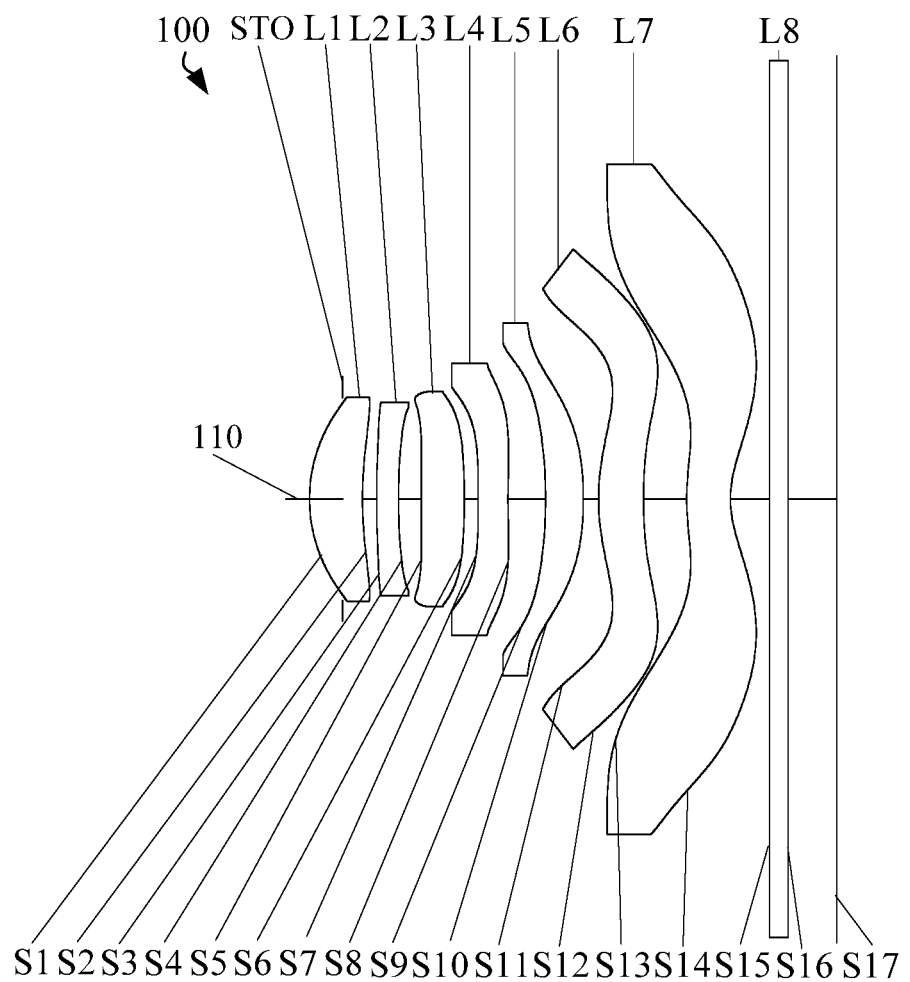
FIG. 7 is a schematic view of an optical system according to a fourth embodiment of the present disclosure.
Figure 8:
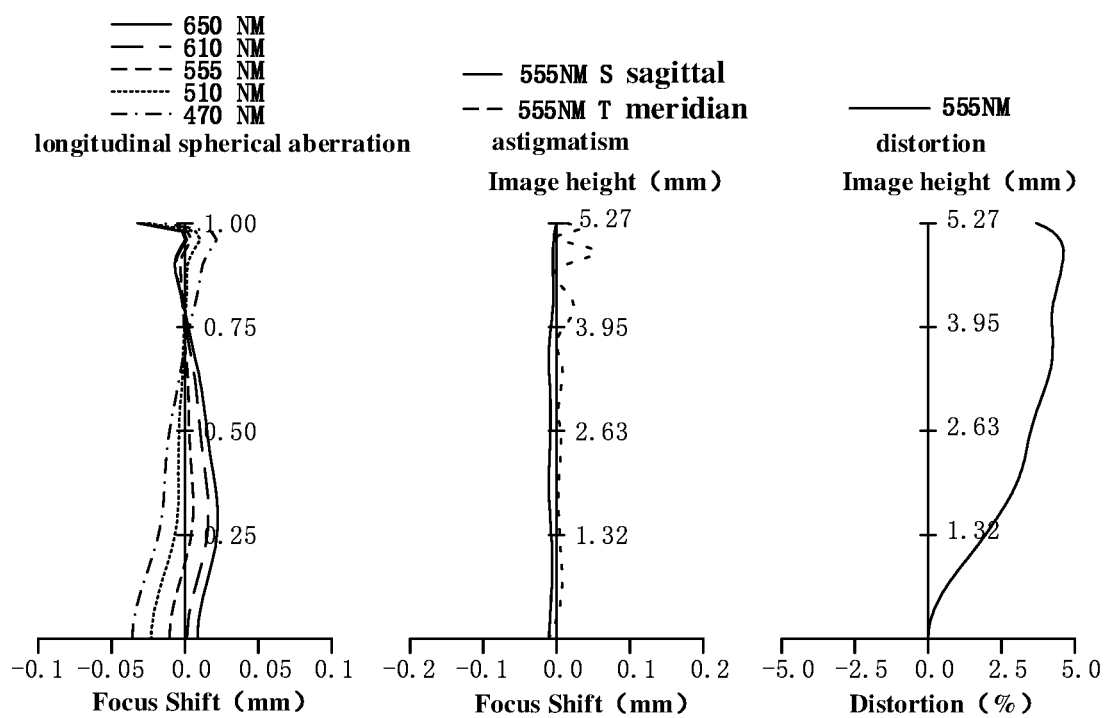
FIG. 8 is a graph showing longitudinal spherical aberration, astigmatism, and distortion of the optical system according to the fourth embodiment of the present disclosure.

Referring to FIGS. 7 and 8, FIG. 7 is a schematic view of an optical system 100 according to a fourth embodiment. The optical system 100 includes, successively in order from an object side to an image side, a stop STO, a first lens L1 having a positive refractive power, a second lens L2 having a negative refractive power, a third lens L3 having a positive refractive power, a fourth lens L4 having a negative refractive power, a fifth lens L5 having a positive refractive power, a sixth lens L6 having a positive refractive power, and a seventh lens L7 having a negative refractive power. FIG. 8 is a graph showing longitudinal spherical aberration, astigmatism, and distortion of the optical system 100 according to the fourth embodiment in order from left to right.

An object side surface S1 of the first lens L1 is convex near an optical axis 110 and concave at a circumference thereof.

An image side surface S2 of the first lens L1 is concave near the optical axis 110 and convex at the circumference thereof.

An object side surface S3 of the second lens L2 is convex near the optical axis 110 and convex at a circumference thereof.

An image side surface S4 of the second lens L2 is concave near the optical axis 110 and concave at the circumference thereof.

An object side surface S5 of the third lens L3 is convex near the optical axis 110 and convex at a circumference thereof.

An image side surface S6 of the third lens L3 is convex near the optical axis 110 and concave at the circumference thereof.

An object side surface S7 of the fourth lens L4 is concave near the optical axis 110 and concave at a circumference thereof.

An image side surface S8 of the fourth lens L4 is concave near the optical axis 110 and concave at the circumference thereof.

An object side surface S9 of the fifth lens L5 is concave near the optical axis 110 and concave at a circumference thereof.

An image side surface S10 of the fifth lens L5 is convex near the optical axis 110 and convex at the circumference thereof.

An object side surface S11 of the sixth lens L6 is convex near the optical axis 110 and convex at a circumference thereof.

An image side surface S12 of the sixth lens L6 is concave near the optical axis 110 and concave at the circumference thereof.

An object side surface S13 of the seventh lens L7 is convex near the optical axis 110 and concave at a circumference thereof.

An image side surface S14 of the seventh lens L7 is concave near the optical axis 110 and convex at the circumference thereof.

The object side surfaces and the image side surfaces of the first lens L1, the second lens L2, the third lens L3, the fourth lens L4, the fifth lens L5, the sixth lens L6, and the seventh lens L7 are all aspherical.

The first lens L1, the second lens L2, the third lens L3, the fourth lens L4, the fifth lens L5, the sixth lens L6, and the seventh lens L7 are all made of plastic.

In addition, various parameters of the optical system 100 are shown in Table 7, and the definition of each of the parameters can be obtained from the first embodiment, which will not be repeated herein.

TABLE 7

Fourth Embodiment
f = 4.72 mm, FNO = 1.945, FOV = 94.306deg, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| — | Object Plane | Spherical | Infinite | Infinite | — | — | — | — |
| STO | Stop | Spherical | Infinite | −0.372 | — | — | — | — |
| S1 | First | Aspherical | 1.937 | 0.592 | Plastic | 1.535 | 55.685 | 5.632 |

TABLE 7-continued

Fourth Embodiment
f = 4.72 mm, FNO = 1.945, FOV = 94.306deg, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| S2 | Lens | Aspherical | 4.847 | 0.159 | | | | |
| S3 | Second | Aspherical | 9.435 | 0.244 | Plastic | 1.671 | 19.239 | −38.344 |
| S4 | Lens | Aspherical | 6.831 | 0.257 | | | | |
| S5 | Third | Aspherical | 120.000 | 0.480 | Plastic | 1.535 | 55.685 | 18.910 |
| S6 | Lens | Aspherical | −11.029 | 0.153 | | | | |
| S7 | Fourth | Aspherical | 635.702 | 0.337 | Plastic | 1.671 | 19.239 | −19.773 |
| S8 | Lens | Aspherical | 13.548 | 0.421 | | | | |
| S9 | Fifth | Aspherical | −5.982 | 0.420 | Plastic | 1.567 | 37.400 | 52.763 |
| S10 | Lens | Aspherical | −5.112 | 0.172 | | | | |
| S11 | Sixth | Aspherical | 2.773 | 0.506 | Plastic | 1.535 | 55.685 | 7.390 |
| S12 | Lens | Aspherical | 8.702 | 0.480 | | | | |
| S13 | Seventh | Aspherical | 2.867 | 0.490 | Plastic | 1.535 | 55.685 | −4.992 |
| S14 | Lens | Aspherical | 1.300 | 0.437 | | | | |
| S15 | Infrared | Spherical | Infinite | 0.210 | Glass | 1.517 | 64.166 | |
| S16 | Filter | Spherical | Infinite | 0.542 | | | | |
| S17 | Imaging Plane | Spherical | Infinite | 0.000 | — | — | — | — |

Further, the aspheric coefficients of the image side surface or the object side surface of the lenses of the optical system 100 are shown in Table 8, and the definition of each of the parameters can be obtained from the first embodiment, and will not be repeated herein.

TABLE 8

| Surface Number | S1 | S2 | S3 | S4 | S5 | S6 | S7 |
|---|---|---|---|---|---|---|---|
| K | −5.960E−01 | 1.331E+01 | 5.623E+01 | 2.364E+01 | 9.800E+01 | 6.185E+01 | 9.800E+01 |
| A4 | 1.074E−02 | −3.708E−02 | −5.427E−02 | −2.927E−02 | −1.261E−02 | −3.081E−02 | −1.068E−01 |
| A6 | 1.204E−02 | −1.055E−02 | 2.161E−02 | 7.332E−03 | −2.016E−02 | −2.138E−02 | 5.836E−02 |
| A8 | −2.397E−02 | −2.438E−02 | −6.841E−02 | 2.931E−02 | 3.764E−02 | 6.544E−02 | −2.347E−01 |
| A10 | 2.693E−02 | 1.137E−01 | 2.405E−02 | −1.738E−02 | −1.738E−01 | −1.856E−01 | 5.257E−01 |
| A12 | −2.738E−04 | −2.831E−02 | −4.418E−01 | 4.464E−02 | 4.349E−01 | 3.008E−01 | −7.180E−01 |
| A14 | −3.471E−02 | 3.943E−01 | 5.067E−01 | −3.744E−02 | −6.662E−01 | −3.059E−01 | 6.197E−01 |
| A16 | 3.755E−02 | −3.195E−01 | −3.635E−01 | 1.320E−02 | 6.055E−01 | 1.873E−01 | −3.333E−01 |
| A18 | −1.716E−02 | 1.398E−01 | 1.493E−01 | 0.000E+00 | −3.033E−01 | −6.342E−02 | 1.026E−01 |
| A20 | 2.900E−03 | −2.574E−02 | −2.676E−02 | 0.000E+00 | 6.471E−02 | 9.346E−03 | −1.375E−02 |

| Surface Number | S8 | S9 | S10 | S11 | S12 | S13 | S14 |
|---|---|---|---|---|---|---|---|
| K | −9.426E+01 | 3.810E+00 | 1.434E+00 | −1.088E+01 | 5.720E+00 | −1.478E+01 | −4.505E+00 |
| A4 | −6.328E−02 | −1.996E−02 | −1.351E−01 | 2.278E−03 | 8.601E−02 | −1.425E−01 | −8.986E−02 |
| A6 | 2.244E−02 | 6.615E−02 | 1.323E−01 | −4.350E−03 | −7.092E−02 | 5.074E−02 | 3.599E−02 |
| A8 | −5.782E−02 | −9.499E−02 | −1.019E−01 | −1.815E−02 | 2.267E−02 | −1.241E−02 | −1.054E−02 |
| A10 | 8.092E−02 | 7.592E−02 | 5.588E−02 | 1.254E−02 | −3.752E−03 | 2.242E−03 | 2.043E−03 |
| A12 | −6.606E−02 | −4.398E−02 | −2.216E−02 | −4.182E−03 | 9.772E−05 | −2.811E−04 | −2.519E−04 |
| A14 | 3.378E−02 | 1.914E−02 | 6.634E−03 | 7.909E−04 | 7.935E−05 | 2.329E−05 | 1.941E−05 |
| A16 | −1.094E−02 | −5.767E−03 | −1.373E−03 | −8.229E−05 | −1.442E−05 | −1.209E−06 | −9.033E−07 |
| A18 | 2.117E−03 | 1.022E−03 | 1.656E−04 | 4.166E−06 | 1.044E−06 | 3.561E−08 | 2.325E−08 |
| A20 | −1.867E−04 | −7.735E−05 | −8.524E−06 | −7.134E−08 | −2.837E−08 | −4.537E−10 | −2.549E−10 |

According to the information of parameters described above, the following data can be derived.

| TTL/ImgH | 1.120 | R71/R72 | 2.205 |
|---|---|---|---|
| f12/|f34| | 1.100 | R51/ET5 | −21.840 |
| (f6-f7)/f | 2.623 | (SD72-SD71)/CT7 | 0.706 |
| f2/R21 | −4.064 | SAG62/SAG61 | 1.266 |

In addition, it can be seen from the aberration diagram in FIG. 8 that the longitudinal spherical aberration, astigmatism, and distortion of the optical system 100 are well controlled, such that the optical system 100 of this embodiment has good imaging quality.

Fifth Embodiment

Figure 9:
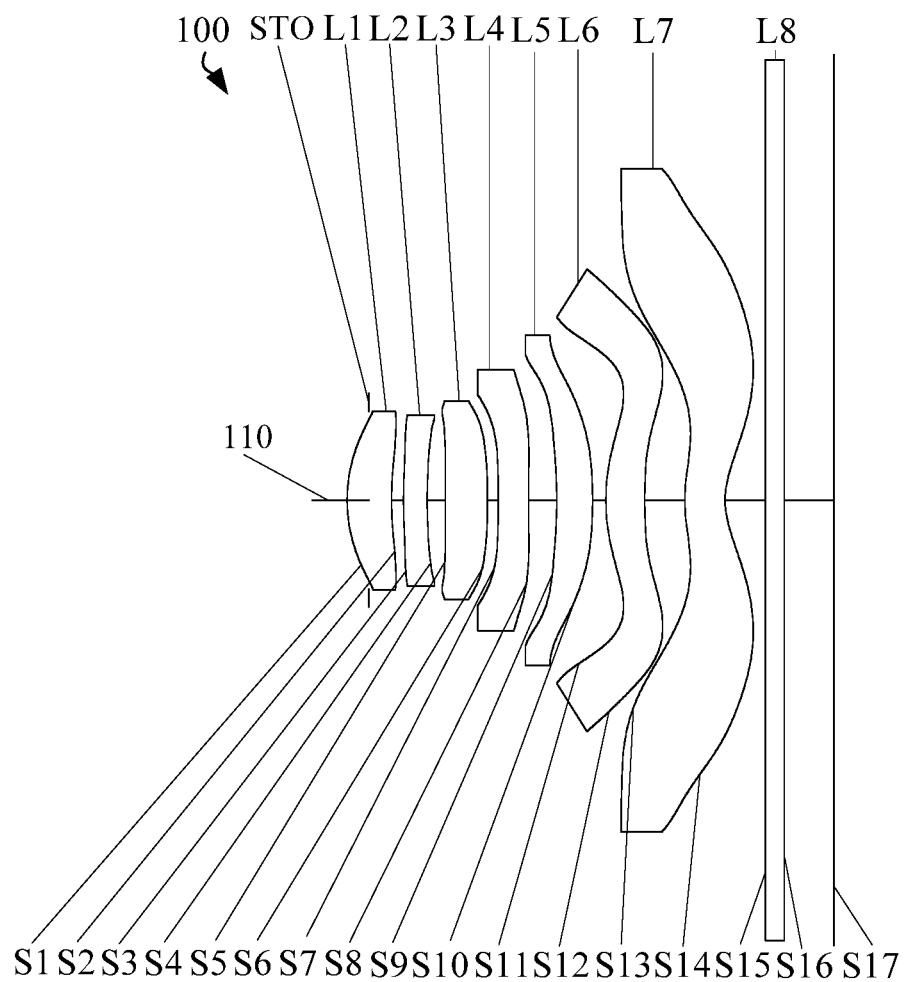
FIG. 9 is a schematic view of an optical system according to a fifth embodiment of the present disclosure.
Figure 10:
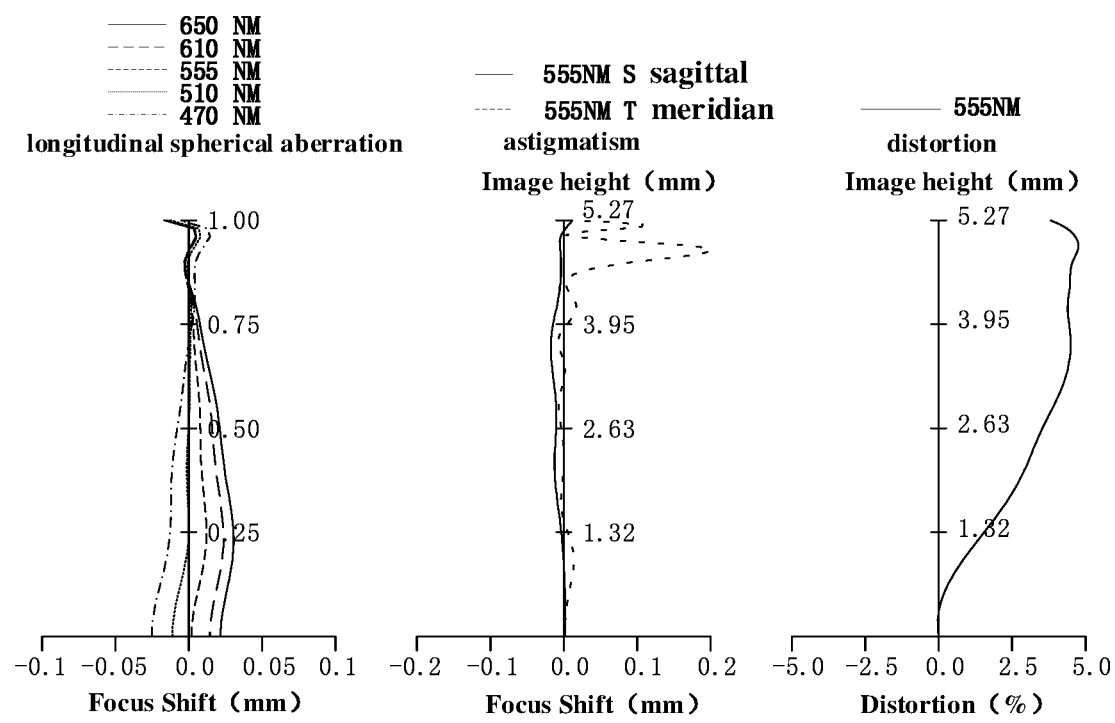
FIG. 10 is a graph showing longitudinal spherical aberration, astigmatism, and distortion of the optical system according to the fifth embodiment of the present disclosure.

Referring to FIGS. 9 and 10, FIG. 9 is a schematic view of an optical system 100 according to a fifth embodiment. The optical system 100 includes, successively in order from an object side to an image side, a stop STO, a first lens L1 having a positive refractive power, a second lens L2 having a negative refractive power, a third lens L3 having a positive refractive power, a fourth lens L4 having a negative refractive power, a fifth lens L5 having a negative refractive power, a sixth lens L6 having a positive refractive power, and a seventh lens L7 having a negative refractive power. FIG. 10 is a graph showing longitudinal spherical aberration, astigmatism, and distortion of the optical system 100 according to the fifth embodiment in order from left to right.

An object side surface S1 of the first lens L1 is convex near an optical axis 110 and concave at a circumference thereof.

An image side surface S2 of the first lens L1 is concave near the optical axis 110 and convex at the circumference thereof.

An object side surface S3 of the second lens L2 is convex near the optical axis 110 and convex at a circumference thereof.

An image side surface S4 of the second lens L2 is concave near the optical axis 110 and concave at the circumference thereof.

An object side surface S5 of the third lens L3 is convex near the optical axis 110 and convex at a circumference thereof.

An image side surface S6 of the third lens L3 is convex near the optical axis 110 and concave at the circumference thereof.

An object side surface S7 of the fourth lens L4 is concave near the optical axis 110 and concave at a circumference thereof.

An image side surface S8 of the fourth lens L4 is concave near the optical axis 110 and convex at the circumference thereof.

An object side surface S9 of the fifth lens L5 is concave near the optical axis 110 and concave at a circumference thereof.

An image side surface S10 of the fifth lens L5 is convex near the optical axis 110 and convex at the circumference thereof.

An object side surface S11 of the sixth lens L6 is convex near the optical axis 110 and convex at a circumference thereof.

An image side surface S12 of the sixth lens L6 is concave near the optical axis 110 and concave at the circumference thereof.

An object side surface S13 of the seventh lens L7 is convex near the optical axis 110 and concave at a circumference thereof.

An image side surface S14 of the seventh lens L7 is concave near the optical axis 110 and convex at the circumference thereof.

The object side surfaces and the image side surfaces of the first lens L1, the second lens L2, the third lens L3, the fourth lens L4, the fifth lens L5, the sixth lens L6, and the seventh lens L7 are all aspherical.

The first lens L1, the second lens L2, the third lens L3, the fourth lens L4, the fifth lens L5, the sixth lens L6, and the seventh lens L7 are all made of plastic.

In addition, various parameters of the optical system 100 are shown in Table 9, and the definition of each of the parameters can be obtained from the first embodiment, which will not be repeated herein.

TABLE 9

Fifth Embodiment
f = 4.327 mm, FNO = 2.05, FOV = 99.295deg, TTL = 5.43 mm

| Surface Number | Surface Name | Surface Shape | Y radius (mm) | Thickness (mm) | Material | Refractive index | Abbe number | Focal Length (mm) |
|---|---|---|---|---|---|---|---|---|
| — | Object Plane | Spherical | Infinite | Infinite | — | — | — | — |
| STO | Stop | Spherical | Infinite | −0.243 | — | — | — | — |
| S1 | First | Aspherical | 1.906 | 0.497 | Plastic | 1.535 | 55.685 | 5.776 |
| S2 | Lens | Aspherical | 4.525 | 0.132 | | | | |
| S3 | Second | Aspherical | 7.844 | 0.263 | Plastic | 1.671 | 19.239 | −98.845 |
| S4 | Lens | Aspherical | 6.920 | 0.204 | | | | |
| S5 | Third | Aspherical | 139.190 | 0.469 | Plastic | 1.535 | 55.685 | 15.264 |
| S6 | Lens | Aspherical | −8.662 | 0.120 | | | | |
| S7 | Fourth | Aspherical | −53.531 | 0.337 | Plastic | 1.671 | 19.239 | −18.388 |
| S8 | Lens | Aspherical | 16.066 | 0.313 | | | | |
| S9 | Fifth | Aspherical | −7.757 | 0.400 | Plastic | 1.567 | 37.400 | −107.863 |
| S10 | Lens | Aspherical | −9.049 | 0.150 | | | | |
| S11 | Sixth | Aspherical | 2.484 | 0.434 | Plastic | 1.535 | 55.685 | 6.022 |
| S12 | Lens | Aspherical | 10.201 | 0.447 | | | | |
| S13 | Seventh | Aspherical | 1.972 | 0.450 | Plastic | 1.535 | 55.685 | −4.771 |
| S14 | Lens | Aspherical | 1.024 | 0.449 | | | | |
| S15 | Infrared | Spherical | Infinite | 0.210 | Glass | 1.517 | 64.166 | — |
| S16 | Filter | Spherical | Infinite | 0.555 | | | | |
| S17 | Imaging Plane | Spherical | Infinite | 0.000 | — | — | — | — |

Further, the aspheric coefficients of the image side surface or the object side surface of the lenses of the optical system 100 are shown in Table 10, and the definition of each of the parameters can be obtained from the first embodiment, and will not be repeated herein.

TABLE 10

| Surface Number | S1 | S2 | S3 | S4 | S5 | S6 | S7 |
|---|---|---|---|---|---|---|---|
| K | −1.191E+00 | 1.294E+01 | 4.819E+01 | 3.056E+01 | −9.800E+01 | 4.638E+01 | 1.421E+01 |
| A4 | 1.051E−02 | −6.468E−02 | −6.834E−02 | −3.816E−02 | −2.556E−02 | −2.377E−02 | −9.507E−02 |
| A6 | 5.462E−02 | −4.763E−02 | −3.283E−02 | 5.795E−02 | 1.525E−01 | −1.039E−01 | −7.034E−03 |
| A8 | −3.050E−01 | 1.202E−01 | 2.016E−01 | −2.004E−01 | −1.074E+00 | 5.919E−01 | 4.667E−02 |
| A10 | 9.370E−01 | −4.455E−01 | −6.331E−01 | 5.709E−01 | 3.888E+00 | −1.959E+00 | −1.279E−01 |
| A12 | −1.799E+00 | 1.065E+00 | 1.582E+00 | −7.535E−01 | −8.736E+00 | 3.723E+00 | 2.000E−01 |
| A14 | 2.133E+00 | −1.542E+00 | −2.470E+00 | 4.829E−01 | 1.222E+01 | −4.304E+00 | −1.574E−01 |

TABLE 10-continued

| | | | | | | | |
|---|---|---|---|---|---|---|---|
| A16 | −1.530E+00 | 1.296E+00 | 2.261E+00 | −1.197E−01 | −1.033E+01 | 2.975E+00 | 4.010E−02 |
| A18 | 6.064E−01 | −5.783E−01 | −1.112E+00 | 0.000E+00 | 4.809E+00 | −1.134E+00 | 1.532E−02 |
| A20 | −1.018E−01 | 1.033E−01 | 2.236E−01 | 0.000E+00 | −9.368E−01 | 1.850E−01 | −7.508E−03 |

| Surface Number | S8 | S9 | S10 | S11 | S12 | S13 | S14 |
|---|---|---|---|---|---|---|---|
| K | 1.728E+01 | 2.681E+00 | 6.401E+00 | −5.603E+00 | 5.208E+00 | −1.369E+01 | −4.718E+00 |
| A4 | −5.974E−02 | −2.592E−02 | −1.713E−01 | 2.337E−02 | 1.436E−01 | −1.729E−01 | −9.943E−02 |
| A6 | 1.255E−02 | 1.166E−01 | 2.001E−01 | −4.023E−02 | −8.648E−02 | 7.561E−02 | 4.378E−02 |
| A8 | −2.554E−02 | −1.826E−01 | −1.830E−01 | 3.146E−02 | 1.681E−03 | −2.289E−02 | −1.411E−02 |
| A10 | 7.623E−03 | 1.708E−01 | 1.362E−01 | −4.449E−02 | 1.480E−02 | 4.909E−03 | 2.994E−03 |
| A12 | 3.126E−02 | −1.229E−01 | −7.909E−02 | 3.317E−02 | −6.909E−03 | −7.011E−04 | −4.024E−04 |
| A14 | −3.973E−02 | 6.481E−02 | 3.162E−02 | −1.335E−02 | 1.554E−03 | 6.439E−05 | 3.368E−05 |
| A16 | 2.103E−02 | −2.238E−02 | −7.761E−03 | 2.967E−03 | −1.924E−04 | −3.645E−06 | −1.697E−06 |
| A18 | −5.324E−03 | 4.399E−03 | 1.040E−03 | −3.409E−04 | 1.257E−05 | 1.157E−07 | 4.703E−08 |
| A20 | 5.259E−04 | −3.668E−04 | −5.814E−05 | 1.578E−05 | −3.385E−07 | −1.576E−09 | −5.514E−10 |

According to the information of parameters described above, the following data can be derived.

| | | | |
|---|---|---|---|
| TTL/ImgH | 1.030 | R71/R72 | 1.926 |
| f12/|f34| | 1.148 | R51/ET5 | −28.859 |
| (f6-f7)/f | 2.494 | (SD72-SD71)/CT7 | 0.735 |
| f2/R21 | −12.602 | SAG62/SAG61 | 1.128 |

In addition, it can be seen from the aberration diagram in FIG. 10 that the longitudinal spherical aberration, astigmatism, and distortion of the optical system 100 are well controlled, such that the optical system 100 of this embodiment has good imaging quality.

Sixth Embodiment

Figure 11:
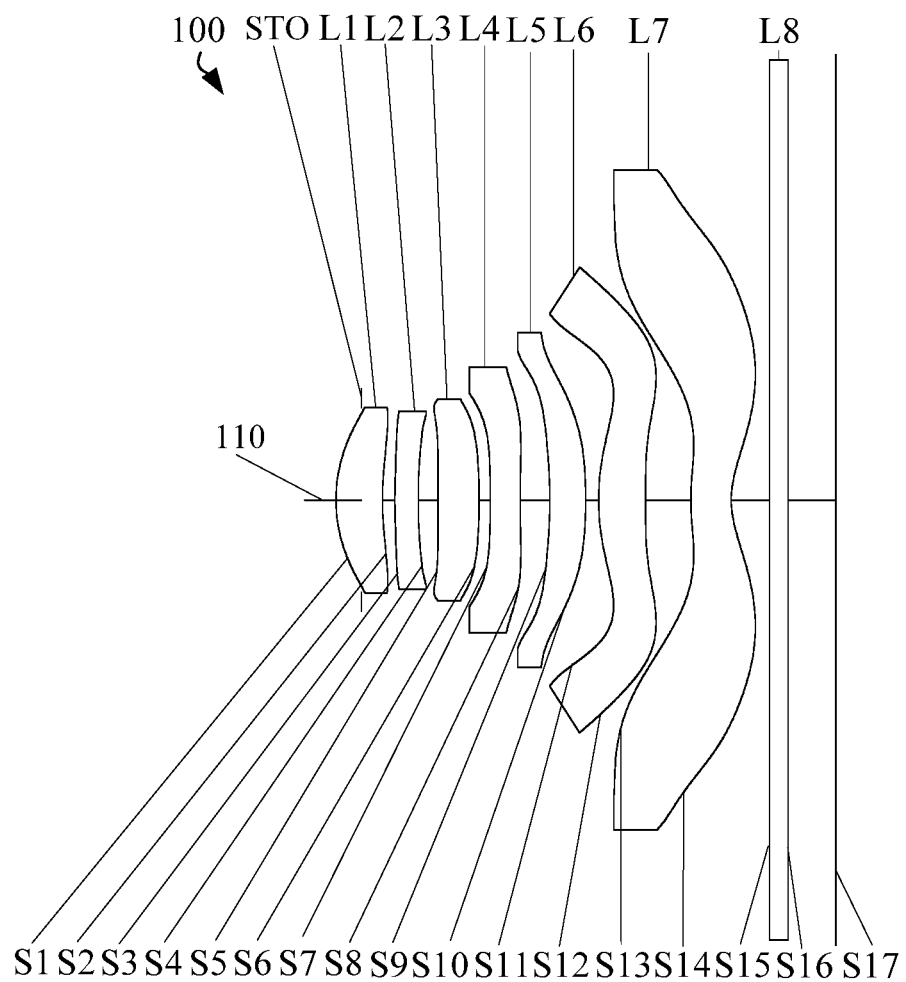
FIG. 11 is a schematic view of an optical system according to a sixth embodiment of the present disclosure.
Figure 12:
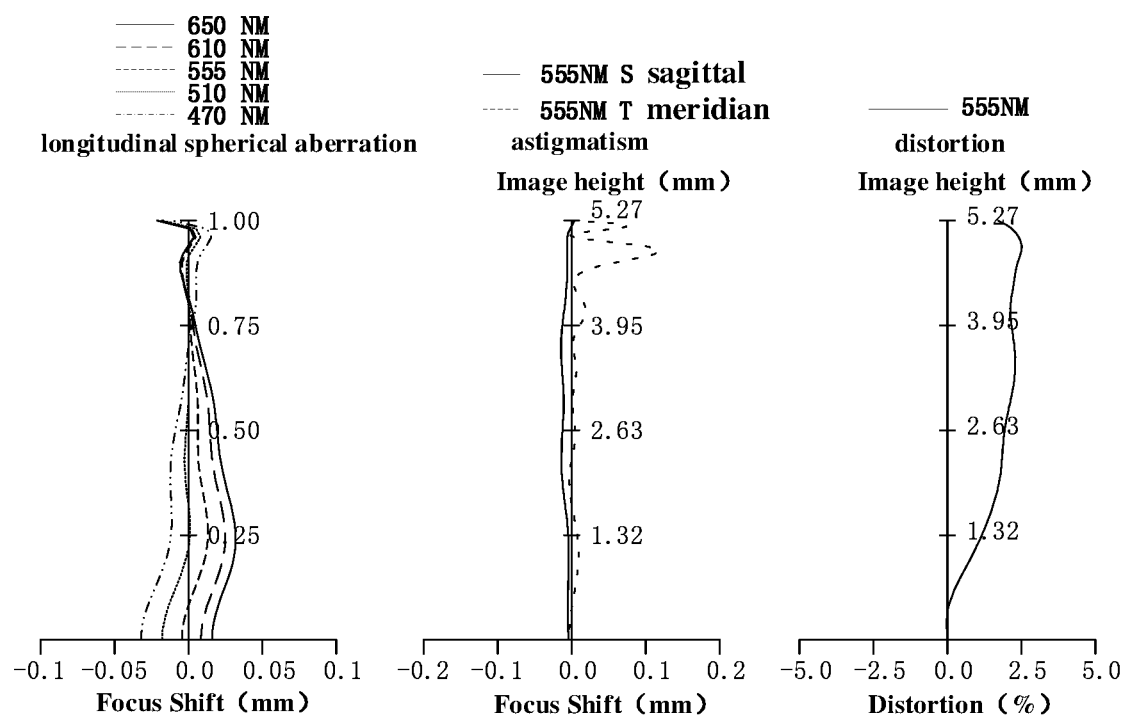
FIG. 12 is a graph showing longitudinal spherical aberration, astigmatism, and distortion of the optical system according to the sixth embodiment of the present disclosure.

Referring to FIGS. 11 and 12, FIG. 11 is a schematic view of an optical system 100 according to a sixth embodiment. The optical system 100 includes, successively in order from an object side to an image side, a stop STO, a first lens L1 having a positive refractive power, a second lens L2 having a negative refractive power, a third lens L3 having a positive refractive power, a fourth lens L4 having a negative refractive power, a fifth lens L5 having a negative refractive power, a sixth lens L6 having a positive refractive power, and a seventh lens L7 having a negative refractive power. FIG. 12 is a graph showing longitudinal spherical aberration, astigmatism, and distortion of the optical system 100 according to the sixth embodiment in order from left to right.

An object side surface S1 of the first lens L1 is convex near an optical axis 110 and concave at a circumference thereof.

An image side surface S2 of the first lens L1 is concave near the optical axis 110 and convex at the circumference thereof.

An object side surface S3 of the second lens L2 is convex near the optical axis 110 and convex at a circumference thereof.

An image side surface S4 of the second lens L2 is concave near the optical axis 110 and concave at the circumference thereof.

An object side surface S5 of the third lens L3 is concave near the optical axis 110 and convex at a circumference thereof.

An image side surface S6 of the third lens L3 is convex near the optical axis 110 and concave at the circumference thereof.

An object side surface S7 of the fourth lens L4 is convex near the optical axis 110 and concave at a circumference thereof.

An image side surface S8 of the fourth lens L4 is concave near the optical axis 110 and convex at the circumference thereof.

An object side surface S9 of the fifth lens L5 is concave near the optical axis 110 and concave at a circumference thereof.

An image side surface S10 of the fifth lens L5 is convex near the optical axis 110 and convex at the circumference thereof.

An object side surface S11 of the sixth lens L6 is convex near the optical axis 110 and convex at a circumference thereof.

An image side surface S12 of the sixth lens L6 is convex near the optical axis 110 and convex at the circumference thereof.

An object side surface S13 of the seventh lens L7 is convex near the optical axis 110 and concave at a circumference thereof.

An image side surface S14 of the seventh lens L7 is concave near the optical axis 110 and convex at the circumference thereof.

The object side surfaces and the image side surfaces of the first lens L1, the second lens L2, the third lens L3, the fourth lens L4, the fifth lens L5, the sixth lens L6, and the seventh lens L7 are all aspherical.

The first lens L1, the second lens L2, the third lens L3, the fourth lens L4, the fifth lens L5, the sixth lens L6, and the seventh lens L7 are all made of plastic.

In addition, various parameters of the optical system 100 are shown in Table 11, and the definition of each of the parameters can be obtained from the first embodiment, which will not be repeated herein.

TABLE 11

Sixth Embodiment
f = 4.506 mm, FNO = 2.05, FOV = 98.103deg, TTL = 5.58 mm

| Surface Number | Surface Name | Surface Shape | Y radius (mm) | Thickness (mm) | Material | Refractive index | Abbe number | Focal Length (mm) |
|---|---|---|---|---|---|---|---|---|
| — | Object Plane | Spherical | Infinite | Infinite | — | — | — | — |
| STO | Stop | Spherical | Infinite | −0.285 | — | — | — | — |
| S1 | First Lens | Aspherical | 1.897 | 0.521 | Plastic | 1.535 | 55.685 | 5.788 |
| S2 | | Aspherical | 4.432 | 0.136 | | | | |
| S3 | Second Lens | Aspherical | 7.892 | 0.262 | Plastic | 1.671 | 19.239 | 133.296 |
| S4 | | Aspherical | 7.155 | 0.220 | | | | |
| S5 | Third Lens | Aspherical | 154.264 | 0.460 | Plastic | 1.535 | 55.685 | 16.165 |
| S6 | | Aspherical | −8.195 | 0.120 | | | | |
| S7 | Fourth Lens | Aspherical | 143.145 | 0.337 | Plastic | 1.671 | 19.239 | −15.963 |
| S8 | | Aspherical | 9.953 | 0.329 | | | | |
| S9 | Fifth Lens | Aspherical | −8.068 | 0.400 | Plastic | 1.567 | 37.400 | −89.333 |
| S10 | | Aspherical | −9.768 | 0.146 | | | | |
| S11 | Sixth Lens | Aspherical | 2.913 | 0.526 | Plastic | 1.535 | 55.685 | 5.146 |
| S12 | | Aspherical | −46.742 | 0.504 | | | | |
| S13 | Seventh Lens | Aspherical | 2.996 | 0.450 | Plastic | 1.535 | 55.685 | −3.874 |
| S14 | | Aspherical | 1.161 | 0.426 | | | | |
| S15 | Infrared Filter | Spherical | Infinite | 0.210 | Glass | 1.517 | 64.166 | — |
| S16 | | Spherical | Infinite | 0.533 | | | | |
| S17 | Imaging Plane | Spherical | Infinite | 0.000 | — | — | — | — |

Further, the aspheric coefficients of the image side surface or the object side surface of the lenses of the optical system 100 are shown in Table 12, and the definition of each of the parameters can be obtained from the first embodiment, and will not be repeated herein.

In addition, it can be seen from the aberration diagram in FIG. 12 that the longitudinal spherical aberration, astigmatism, and distortion of the optical system 100 are well controlled, such that the optical system 100 of this embodiment has good imaging quality.

TABLE 12

| Surface Number | S1 | S2 | S3 | S4 | S5 | S6 | S7 |
|---|---|---|---|---|---|---|---|
| K | −1.007E+00 | 1.312E+01 | 4.682E+01 | 3.037E+01 | −9.800E+01 | 3.993E+01 | 9.800E+01 |
| A4 | 8.986E−03 | −5.835E−02 | −6.496E−02 | −3.129E−02 | −1.736E−02 | −2.053E−02 | −1.129E−01 |
| A6 | 5.728E−02 | −3.666E−02 | −1.635E−03 | 2.649E−02 | 1.363E−01 | −7.438E−02 | 3.786E−02 |
| A8 | −2.660E−01 | 3.060E−02 | −2.304E−02 | −7.998E−02 | −9.844E−01 | 4.735E−01 | −3.474E−02 |
| A10 | 7.117E−01 | −7.200E−02 | 1.812E−02 | 2.544E−01 | 3.463E+00 | −1.599E+00 | −1.691E−02 |
| A12 | −1.195E+00 | 9.966E−02 | −3.430E−01 | −3.044E−01 | −7.468E+00 | 3.015E+00 | 9.325E−02 |
| A14 | 1.245E+00 | −4.486E−02 | 4.197E−01 | 1.636E−01 | 9.948E+00 | −3.429E+00 | −9.941E−02 |
| A16 | −7.873E−01 | −6.128E−02 | −3.621E−01 | −2.962E−02 | −7.970E+00 | 2.320E+00 | 3.090E−02 |
| A18 | 2.743E−01 | 8.189E−02 | 1.961E−01 | 0.000E+00 | 3.499E+00 | −8.614E−01 | 9.741E−03 |
| A20 | −4.032E−02 | −2.903E−02 | −4.926E−02 | 0.000E+00 | −6.394E−01 | 1.365E−01 | −5.366E−03 |

| Surface Number | S8 | S9 | S10 | S11 | S12 | S13 | S14 |
|---|---|---|---|---|---|---|---|
| K | −3.918E+01 | 4.133E+00 | 9.477E+00 | −6.319E+00 | 9.800E+01 | −2.457E+01 | −5.134E+00 |
| A4 | −7.592E−02 | −3.705E−02 | −1.463E−01 | 2.028E−02 | 1.507E−01 | −1.790E−01 | −1.018E−01 |
| A6 | 4.421E−02 | 1.145E−01 | 1.480E−01 | −3.639E−02 | −9.748E−02 | 7.576E−02 | 4.444E−02 |
| A8 | −6.351E−02 | −1.610E−01 | −1.406E−01 | 1.194E−02 | 2.277E−02 | −2.104E−02 | −1.376E−02 |
| A10 | 4.784E−02 | 1.361E−01 | 1.142E−01 | −1.052E−02 | 7.130E−04 | 4.159E−03 | 2.805E−03 |
| A12 | −4.574E−03 | −8.538E−02 | −6.863E−02 | 7.816E−03 | −1.993E−03 | −5.610E−04 | −3.651E−04 |
| A14 | −1.829E−02 | 3.926E−02 | 2.725E−02 | −3.277E−03 | 5.635E−04 | 4.961E−05 | 2.980E−05 |
| A16 | 1.330E−02 | −1.223E−02 | −6.552E−03 | 7.502E−04 | −7.663E−05 | −2.738E−06 | −1.470E−06 |
| A18 | −3.788E−03 | 2.250E−03 | 8.583E−04 | −8.664E−05 | 5.259E−06 | 8.537E−08 | 4.003E−08 |
| A20 | 3.957E−04 | −1.801E−04 | −4.695E−05 | 3.933E−06 | −1.459E−07 | −1.148E−09 | −4.623E−10 |

According to the information of parameters described above, the following data can be derived.

| TTL/ImgH | 1.059 | R71/R72 | 2.581 |
|---|---|---|---|
| f12/\|f34\| | 1.360 | R51/ET5 | −30.866 |
| (f6−f7)/f | 2.002 | (SD72−SD71)/CT7 | 0.730 |
| f2/R21 | −16.890 | SAG62/SAG61 | 1.340 |

Seventh Embodiment

Figure 13:
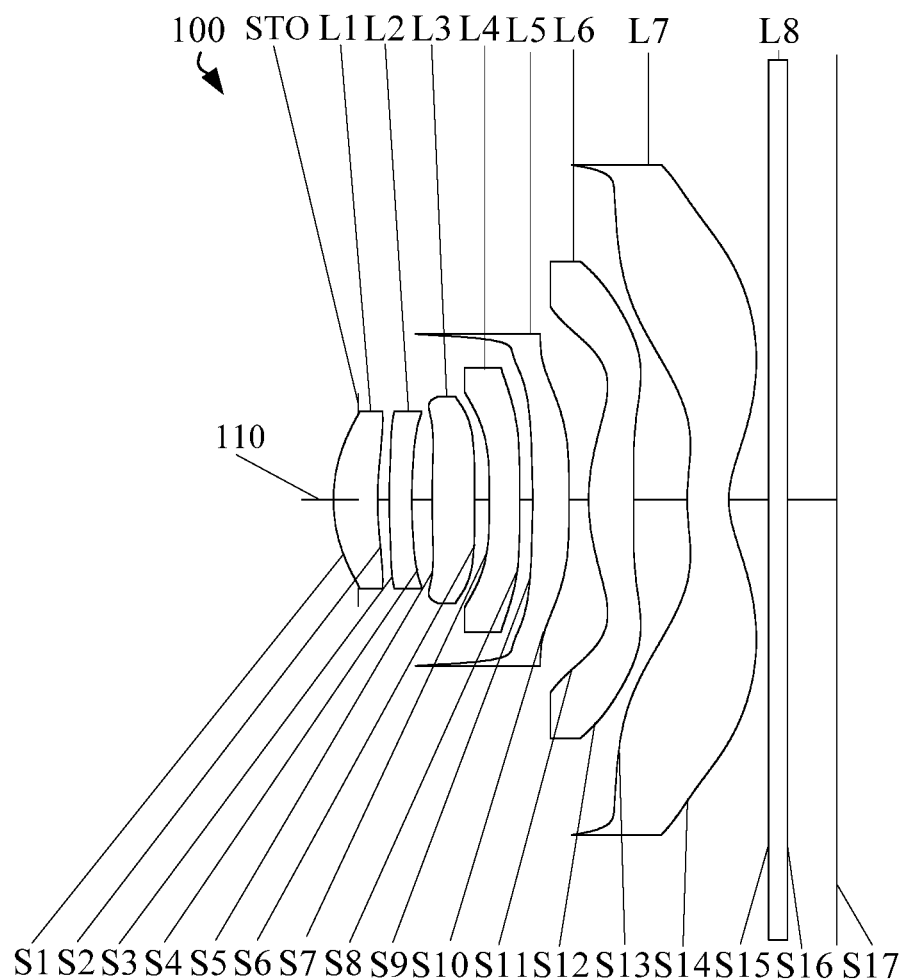
FIG. 13 is a schematic view of an optical system according to a seventh embodiment of the present disclosure.
Figure 14:
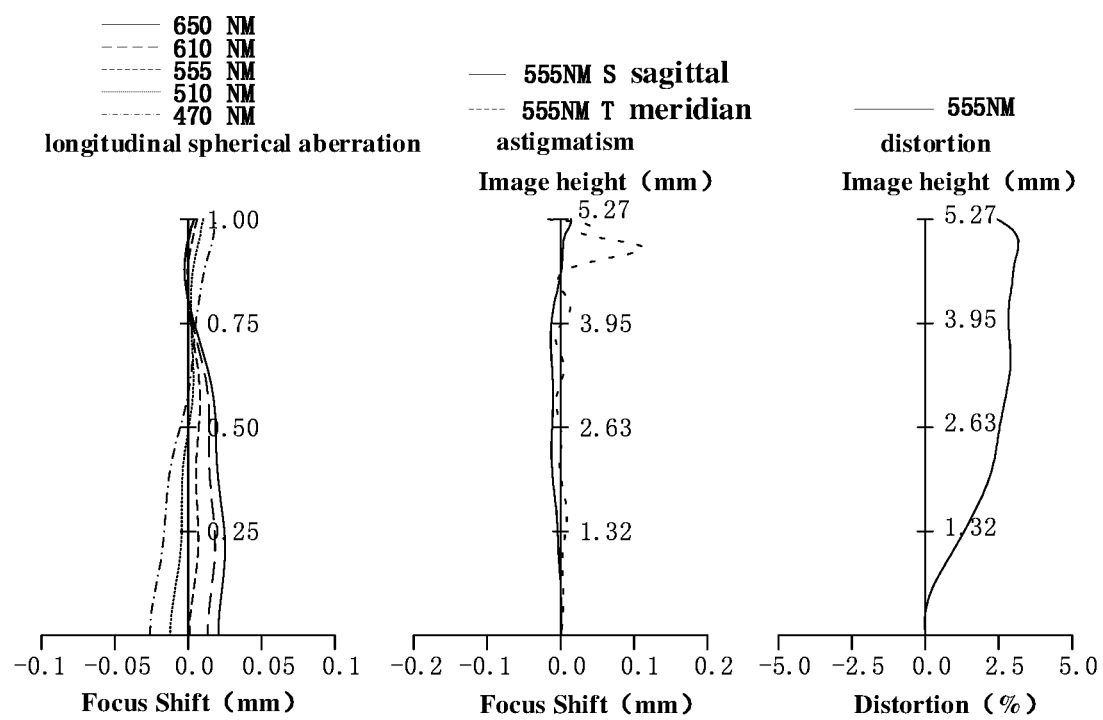
FIG. 14 is a graph showing longitudinal spherical aberration, astigmatism, and distortion of the optical system according to the seventh embodiment of the present disclosure.

Referring to FIGS. 13 and 14, FIG. 13 is a schematic view of an optical system 100 according to a seventh embodiment. The optical system 100 includes, successively in order from an object side to an image side, a stop STO, a first lens L1 having a positive refractive power, a second lens L2 having a negative refractive power, a third lens L3 having a positive refractive power, a fourth lens L4 having a negative refractive power, a fifth lens L5 having a negative refractive power, a sixth lens L6 having a positive refractive power, and a seventh lens L7 having a negative refractive power. FIG. 14 is a graph showing longitudinal spherical aberration, astigmatism, and distortion of the optical system 100 according to the seventh embodiment in order from left to right.

An object side surface S1 of the first lens L1 is convex near an optical axis 110 and concave at a circumference thereof.

An image side surface S2 of the first lens L1 is concave near the optical axis 110 and convex at the circumference thereof.

An object side surface S3 of the second lens L2 is convex near the optical axis 110 and convex at a circumference thereof.

An image side surface S4 of the second lens L2 is concave near the optical axis 110 and concave at the circumference thereof.

An object side surface S5 of the third lens L3 is convex near the optical axis 110 and convex at a circumference thereof.

An image side surface S6 of the third lens L3 is concave near the optical axis 110 and concave at the circumference thereof.

An object side surface S7 of the fourth lens L4 is concave near the optical axis 110 and concave at a circumference thereof.

An image side surface S8 of the fourth lens L4 is convex near the optical axis 110 and concave at the circumference thereof.

An object side surface S9 of the fifth lens L5 is concave near the optical axis 110 and convex at a circumference thereof.

An image side surface S10 of the fifth lens L5 is concave near the optical axis 110 and concave at the circumference thereof.

An object side surface S11 of the sixth lens L6 is convex near the optical axis 110 and convex at a circumference thereof.

An image side surface S12 of the sixth lens L6 is convex near the optical axis 110 and convex at the circumference thereof.

An object side surface S13 of the seventh lens L7 is convex near the optical axis 110 and convex at a circumference thereof.

An image side surface S14 of the seventh lens L7 is concave near the optical axis 110 and convex at the circumference thereof.

The object side surfaces and the image side surfaces of the first lens L1, the second lens L2, the third lens L3, the fourth lens L4, the fifth lens L5, the sixth lens L6, and the seventh lens L7 are all aspherical.

The first lens L1, the second lens L2, the third lens L3, the fourth lens L4, the fifth lens L5, the sixth lens L6, and the seventh lens L7 are all made of plastic.

In addition, various parameters of the optical system 100 are shown in Table 13, and the definition of each of the parameters can be obtained from the first embodiment, which will not be repeated herein.

TABLE 13

Seventh Embodiment
f = 4.469 mm, FNO = 2.12, FOV = 98.209deg, TTL = 5.62 mm

| Surface Number | Surface Name | Surface Shape | Y radius (mm) | Thickness (mm) | Material | Refractive index | Abbe number | Focal Length (mm) |
|---|---|---|---|---|---|---|---|---|
| — | Object Plane | Spherical | Infinite | Infinite | — | — | — | — |
| STO | Stop | Spherical | Infinite | −0.278 | — | — | — | — |
| S1 | First | Aspherical | 1.914 | 0.494 | Plastic | 1.535 | 55.685 | 5.862 |
| S2 | Lens | Aspherical | 4.473 | 0.128 | | | | |
| S3 | Second | Aspherical | 7.933 | 0.252 | Plastic | 1.671 | 19.239 | −52.441 |
| S4 | Lens | Aspherical | 6.391 | 0.228 | | | | |
| S5 | Third | Aspherical | 12.969 | 0.474 | Plastic | 1.535 | 55.685 | 24.620 |
| S6 | Lens | Aspherical | 852.652 | 0.167 | | | | |
| S7 | Fourth | Aspherical | −14.725 | 0.337 | Plastic | 1.671 | 19.239 | −27.782 |
| S8 | Lens | Aspherical | −70.842 | 0.145 | | | | |
| S9 | Fifth | Aspherical | −10.629 | 0.405 | Plastic | 1.567 | 37.400 | −17.808 |
| S10 | Lens | Aspherical | 205.948 | 0.218 | | | | |
| S11 | Sixth | Aspherical | 2.403 | 0.505 | Plastic | 1.535 | 55.685 | 4.175 |
| S12 | Lens | Aspherical | −29.301 | 0.595 | | | | |
| S13 | Seventh | Aspherical | 2.390 | 0.465 | Plastic | 1.535 | 55.685 | −4.117 |
| S14 | Lens | Aspherical | 1.068 | 0.446 | | | | |
| S15 | Infrared | Spherical | Infinite | 0.210 | Glass | 1.517 | 64.166 | — |
| S16 | Filter | Spherical | Infinite | 0.552 | | | | |
| S17 | Imaging Plane | Spherical | Infinite | 0.000 | — | — | — | — |

Further, the aspheric coefficients of the image side surface or the object side surface of the lenses of the optical system 100 are shown in Table 14, and the definition of each of the parameters can be obtained from the first embodiment, and will not be repeated herein.

TABLE 14

| Surface Number | S1 | S2 | S3 | S4 | S5 | S6 | S7 |
| --- | --- | --- | --- | --- | --- | --- | --- |
| K | −1.005E+00 | 1.281E+01 | 4.697E+01 | 2.762E+01 | −7.039E+01 | 9.800E+01 | −9.075E+00 |
| A4 | 1.345E−02 | −6.368E−02 | −7.240E−02 | −4.258E−02 | −5.060E−02 | −1.072E−01 | −1.381E−01 |
| A6 | 2.339E−02 | −1.812E−02 | 4.348E−02 | 4.767E−02 | 1.907E−01 | 2.100E−01 | 7.076E−02 |
| A8 | −1.215E−01 | −1.054E−02 | −1.758E−01 | −7.598E−02 | −1.059E+00 | −6.128E−01 | −6.020E−03 |
| A10 | 3.651E−01 | 4.202E−02 | 7.779E−01 | 2.349E−01 | 3.286E+00 | 1.032E+00 | −2.775E−01 |
| A12 | −7.051E−01 | −8.925E−02 | −1.814E+00 | −3.204E−01 | −6.479E+00 | −1.187E+00 | 5.961E−01 |
| A14 | 8.443E−01 | 9.713E−02 | 2.577E+00 | 2.044E−01 | 8.029E+00 | 9.334E−01 | −5.570E−01 |
| A16 | −6.207E−01 | −7.006E−02 | −2.237E+00 | −4.859E−02 | −6.045E+00 | −4.882E−01 | 2.567E−01 |
| A18 | 2.543E−01 | 3.420E−02 | 1.093E+00 | 0.000E+00 | 2.499E+00 | 1.516E−01 | −5.075E−02 |
| A20 | −4.472E−02 | −9.559E−03 | −2.317E−01 | 0.000E+00 | −4.276E−01 | −2.016E−02 | 1.895E−03 |
| Surface Number | S8 | S9 | S10 | S11 | S12 | S13 | S14 |
| K | 9.499E+01 | −4.369E+01 | −9.800E+01 | −5.650E+00 | 9.800E+01 | −2.209E+01 | −5.207E+00 |
| A4 | .3.701E−02 | 2.878E−02 | −1.332E−01 | −1.366E−02 | 5.341E−02 | −2.088E−01 | −9.543E−02 |
| A6 | −2.320E−02 | −1.253E−02 | 7.685E−02 | 5.737E−03 | 1.532E−02 | 9.361E−02 | 4.178E−02 |
| A8 | 5.778E−02 | −2.700E−02 | −5.081E−02 | −5.110E−03 | −3.199E−02 | −2.575E−02 | −1.217E−02 |
| A10 | .1.418E−01 | 3.125E−02 | 4.265E−02 | −4.116E−03 | 1.385E−02 | 4.915E−03 | 2.300E−03 |
| A12 | 1.943E−01 | −2.150E−02 | −3.035E−02 | 3.140E−03 | −3.155E−03 | −6.444E−04 | −2.812E−04 |
| A14 | −1.403E−01 | 1.292E−02 | 1.433E−02 | −9.473E−04 | 4.359E−04 | 5.618E−05 | 2.188E−05 |
| A16 | 5.504E−02 | −5.755E−03 | −3.960E−03 | 1.664E−04 | −3.688E−05 | −3.094E−06 | −1.039E−06 |
| A18 | −1.117E−02 | 1.418E−03 | 5.758E−04 | −1.639E−05 | 1.760E−06 | 9.713E−08 | 2.733E−08 |
| A20 | 9.198E−04 | −1.383E−04 | −3.403E−05 | 6.787E−07 | −3.604E−08 | −1.323E−09 | −3.048E−10 |

According to the information of parameters described above, the following data can be derived.

| TTL/ImgH | 1.066 | R71/R72 | 2.237 |
| --- | --- | --- | --- |
| f12/\|f34\| | 4.385 | R51/ET5 | −33.992 |
| (f6-f7)/f | 1.856 | (SD72-SD71)/CT7 | 0.944 |
| f2/R21 | −6.611 | SAG62/SAG61 | 1.352 |

In addition, it can be seen from the aberration diagram in FIG. 14 that the longitudinal spherical aberration, astigmatism, and distortion of the optical system 100 are well controlled, such that the optical system 100 of this embodiment has good imaging quality.

Figure 15:
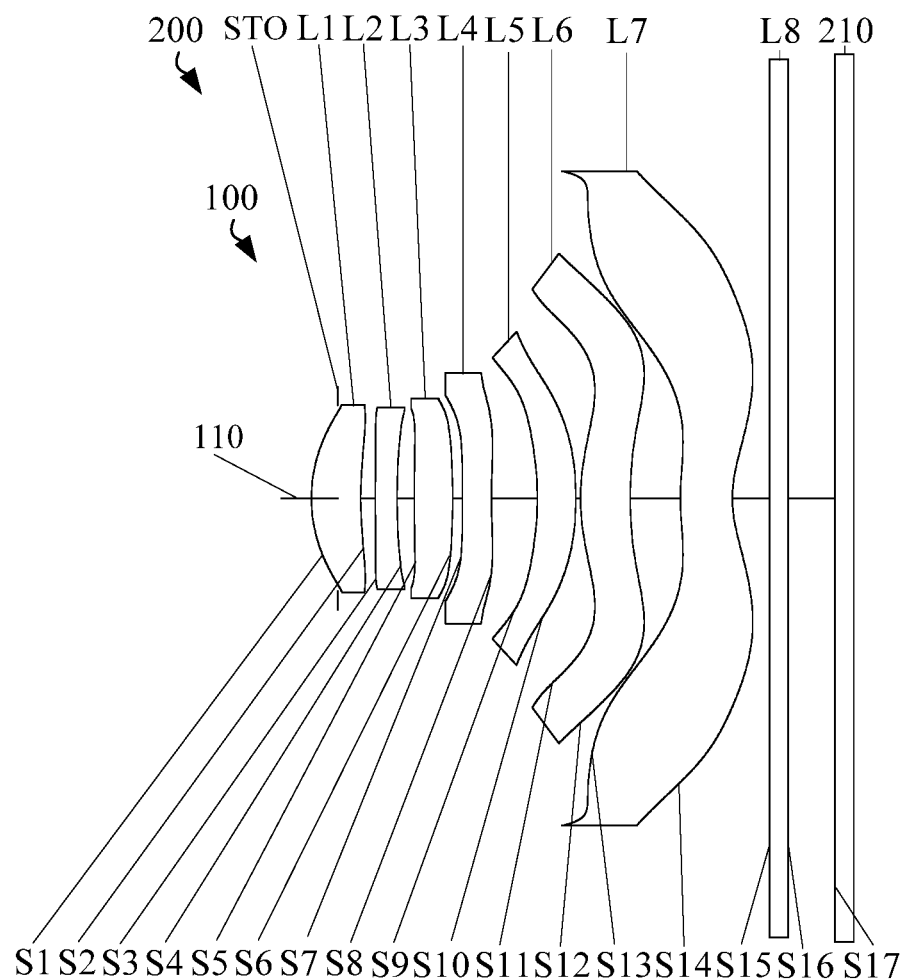
FIG. 15 a schematic view of an image acquisition module according to an embodiment of the present disclosure.

Referring to FIG. 15, in some embodiments, the optical system 100 and a photosensitive element 210 can be assembled to form an image acquisition module 200. In this case, a photosensitive surface of the photosensitive element 210 can be regard as the imaging plane S17 of the optical system 100. The image acquisition module 200 may also be provided with an infrared filter L8. The infrared filter L8 is arranged between the image side surface S14 of the seventh lens L7 and the imaging plane S17. Specifically, the photosensitive element 210 can be a Charge Coupled Device (CCD) or a Complementary Metal Oxide Semiconductor (CMOS) sensor. By applying the above optical system 100 in the image acquisition module 200, the image acquisition module 200 can realize both the miniaturized design and the large image plane characteristic, such that the image acquisition module 200 can be applied in portable electronic devices and have good imaging quality.

Figure 16:
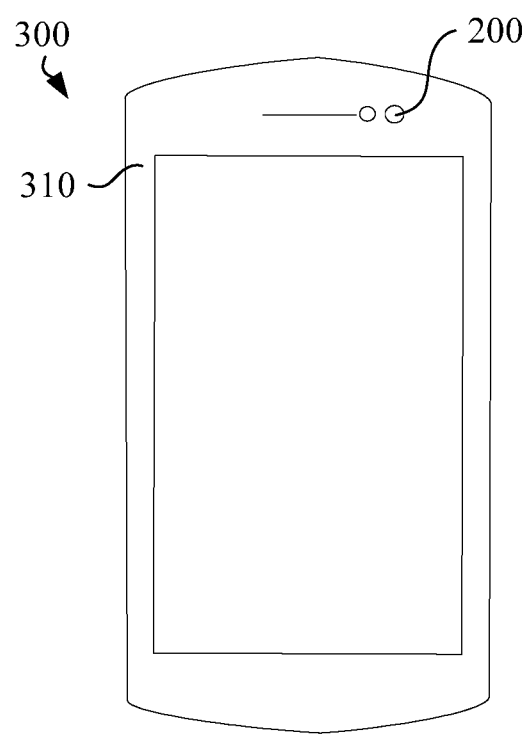
FIG. 16 is a schematic view of an electronic device according to an embodiment of the present disclosure.

Referring to FIGS. 15 and 16, in some embodiments, the image acquisition module 200 is applied in the electronic device 300. The electronic device includes a housing 310. The image acquisition module 200 is located on the housing 310. Specifically, the electronic device 300 may be, but is not limited to, a portable phone, a video phone, a smart phone, an e-book reader, a driving recorder, or other in-vehicle camera device or a wearable device such as a smart watch. When the electronic device 300 is a smart phone, the housing 310 may be a middle frame of the electronic device 300. The image acquisition module 200 is applied in the electronic device 300, such that the electronic device 300 can have a portable design, and have good imaging quality, thereby improving the user experience.

The technical features of the above-described embodiments can be combined arbitrarily. To simplify the description, not all possible combinations of the technical features in the above embodiments are described. However, all of the combinations of these technical features should be considered as being fallen within the scope of the present disclosure, as long as such combinations do not contradict with each other.

The foregoing embodiments merely illustrate some embodiments of the present disclosure, and descriptions thereof are relatively specific and detailed. However, it should not be understood as a limitation to the patent scope of the present disclosure. It should be noted that, a person of ordinary skill in the art may further make some variations and improvements without departing from the concept of the present disclosure, and the variations and improvements falls in the protection scope of the present disclosure. Therefore, the protection scope of the present disclosure shall be subject to the appended claims.

What is claimed is:

1. An optical system, comprising, successively in order from an object side to an image side along an optical axis:
    a first lens having a positive refractive power, an object side surface of the first lens being convex near the optical axis, and an image side surface of the first lens being concave near the optical axis;
    a second lens having a negative refractive power, an object side surface of the second lens being convex near the optical axis, and an image side surface of the second lens being concave near the optical axis;
    a third lens having a positive refractive power;
    a fourth lens having a negative refractive power;

a fifth lens having a refractive power, an object side surface of the fifth lens being concave near the optical axis;

a sixth lens having a positive refractive power, an object side surface of the sixth lens being convex near the optical axis;

a seventh lens having a negative refractive power, an object side surface of the seventh lens being convex near the optical axis, and an image side surface of the seventh lens being concave near the optical axis;

wherein the optical system satisfies the following condition:

$$1 \leq TTL/\text{ImgH} \leq 1.12;$$

wherein TTL is a distance from the object side surface of the first lens to an imaging plane of the optical system on the optical axis, and ImgH is half of an image height corresponding to the maximum angle of field of view of the optical system.

2. The optical system according to claim 1, further satisfying the following condition:

$$1 \leq SAG62/SAG61 \leq 1.5;$$

wherein SAG62 is a sagittal height of an image side surface of the sixth lens at the maximum effective aperture, and SAG61 is a sagittal height of the object side surface of the sixth lens at the maximum effective aperture.

3. The optical system according to claim 1, further satisfying the following condition:

$$1.5 \leq (f6 - f7)/f \leq 3;$$

wherein f6 is an effective focal length of the sixth lens, f7 is an effective focal length of the seventh lens, and f is an effective focal length of the optical system.

4. The optical system according to claim 1, further satisfying the following condition:

$$-17 \leq f2/R21 \leq -1;$$

wherein f2 is an effective focal length of the second lens, and R21 is a radius of curvature of the object side surface of the second lens at the optical axis.

5. The optical system according to claim 1, further satisfying the following condition:

$$1.5 \leq R71/R72 \leq 3;$$

wherein R71 is a radius of curvature of the object side surface of the seventh lens at the optical axis, and R72 is a radius of curvature of the image side surface of the seventh lens at the optical axis.

6. The optical system according to claim 1, further satisfying the following condition:

$$-35 \leq R51/ET5 \leq -13;$$

wherein R51 is a radius of curvature of the object side surface of the fifth lens at the optical axis, and ET5 is a distance from a portion of the object side surface at the maximum effective aperture to a portion of an image side surface at the maximum effective aperture of the fifth lens in a direction of the optical axis.

7. The optical system according to claim 1, further satisfying the following condition:

$$0.5 \leq (SD72 - SD71)/CT7 \leq 1;$$

wherein SD72 is the maximum effective semi-aperture of the image side surface of the seventh lens, SD71 is the maximum effective semi-aperture of the object side surface of the seventh lens, and CT7 is a thickness of the seventh lens on the optical axis.

8. The optical system according to claim 1, further satisfying the following conditions:

$$f34 < 0;$$

$$1 \leq f12/|f34| \leq 4.5;$$

wherein f12 is a combined focal length of the first lens and the second lens, and f34 is a combined focal length of the third lens and the fourth lens.

9. An image acquisition module, comprising a photosensitive element and the optical system according to claim 1, wherein the photosensitive element is arranged on the image side of the optical system.

10. An electronic device, comprising a housing and the image acquisition module according to claim 9, wherein the image acquisition module is located on the housing.

* * * * *